(12) United States Patent
Ward

(10) Patent No.: US 10,063,932 B2
(45) Date of Patent: Aug. 28, 2018

(54) SYSTEMS AND METHODS FOR PROVIDING A CONTEXTUAL MENU WITH INFORMATION RELATED TO AN EMERGENCY ALERT

(71) Applicant: Rovi Guides, Inc., Santa Clara, CA (US)

(72) Inventor: Daniel Thomas Ward, Encino, CA (US)

(73) Assignee: ROVI GUIDES, INC., San Jose, CA (US)

( * ) Notice: Subject to any disclaimer, the term of this patent is extended or adjusted under 35 U.S.C. 154(b) by 0 days.

(21) Appl. No.: 14/954,162

(22) Filed: Nov. 30, 2015

(65) Prior Publication Data

US 2017/0155965 A1    Jun. 1, 2017

(51) Int. Cl.
    *H04N 21/488* (2011.01)
    *H04N 21/84* (2011.01)
    *H04N 21/81* (2011.01)
    *H04N 21/482* (2011.01)
    *H04N 21/44* (2011.01)
    *H04N 21/439* (2011.01)
    *H04N 21/433* (2011.01)

(52) U.S. Cl.
    CPC ..... *H04N 21/4882* (2013.01); *H04N 21/4334* (2013.01); *H04N 21/4394* (2013.01); *H04N 21/44008* (2013.01); *H04N 21/4821* (2013.01); *H04N 21/4828* (2013.01); *H04N 21/812* (2013.01); *H04N 21/84* (2013.01)

(58) Field of Classification Search
    None
    See application file for complete search history.

(56) References Cited

U.S. PATENT DOCUMENTS

| | | | |
|---|---|---|---|
| 6,239,794 B1 | 5/2001 | Yuen | |
| 6,388,714 B1 | 5/2002 | Schein | |
| 6,564,378 B1 | 5/2003 | Satterfield | |
| 6,606,128 B2 | 8/2003 | Hanafee | |
| 6,756,997 B1 | 6/2004 | Ward, II | |
| 7,007,008 B2 * | 2/2006 | Goel | G06F 17/30864 707/768 |
| 7,165,098 B1 | 1/2007 | Boyer | |
| 7,761,892 B2 | 7/2010 | Ellis | |
| 7,768,388 B2 | 8/2010 | Putterman | |
| 8,046,801 B2 | 10/2011 | Ellis | |

(Continued)

*Primary Examiner* — Hoang Vu A Nguyen Ba
(74) *Attorney, Agent, or Firm* — Haley Guiliano LLP

(57) ABSTRACT

Systems and methods are described herein for presenting additional information related to an emergency alert. A media guidance application may detect that a new emergency alert has been received. The media guidance application may then perform a search of various content sources (e.g., program listings, the Internet, etc.) for content related to the emergency alert. The media guidance application may then present the search results in a contextual menu enabling the user to access content of the search results. The media guidance application may also provide more options, such as, recording or pausing media content that the user was in the process of consuming when the emergency alert was generated, and an option to the user not to bring up the contextual menu again if the same emergency alert is repeated.

16 Claims, 18 Drawing Sheets

(56) References Cited

U.S. PATENT DOCUMENTS

| | | | |
|---|---|---|---|
| 8,200,688 B2* | 6/2012 | Messer | G06F 17/30038 |
| | | | 348/465 |
| 8,219,577 B2* | 7/2012 | Nakano | G06F 17/30663 |
| | | | 707/767 |
| 2002/0174430 A1 | 1/2002 | Ellis | |
| 2003/0110499 A1 | 1/2003 | Knudson | |
| 2004/0003407 A1 | 1/2004 | Hanafee | |
| 2005/0251827 A1 | 7/2005 | Ellis | |
| 2006/0200842 A1 | 9/2006 | Chapman | |
| 2010/0153885 A1 | 6/2010 | Yates | |
| 2011/0197223 A1* | 8/2011 | Ravula | H04N 21/814 |
| | | | 725/33 |
| 2012/0054168 A1* | 3/2012 | Chung | G06F 17/30864 |
| | | | 707/706 |
| 2012/0303452 A1* | 11/2012 | Xue | H04L 12/5805 |
| | | | 705/14.49 |
| 2013/0268969 A1 | 10/2013 | Hurd | |

* cited by examiner

700

```
701 ...
702 Initialization Subroutine
703 ...
704 //Routine to receive an emergency alert:
705   data = Process-signal ()
706   field = get-signal-type-data (data)
707   value = Retrieve-from-field (field)
708   For each target-signal-type in a plurality of target signal types
709       If  target-signal-type == emergency alert
710             target-signal-type-value = target-signal-type.value
711       end if
712   next step of the For Loop
714   If (value == target-signal-type.value)
714         emergency-alert-received = true
715         emergency-alert-data = field
716   end if
717 ...
718 Termination Subroutine
719 ...
```

```
901 ...
902 Initialization Subroutine
903 ...
904 //Routine to identify a metadata portion of the emergency alert:
905   received-alert = Retrieve-alert-data()
906   received-alert = parse (received-alert)
907   alert-formats = Retrieve-emergency-alert-formats()
908   For each alert-format in alert-formats
909         If (alert-format.identifying-portion.inString(received-alert)
910               metadata-markers = retrieve-markers (alert-format.markers)
911               metadata-portion = identify-metadata (metadata-markers)
912               Termination Subroutine
913         end if
914   Next Step of the For Loop
915   received-alert-format = unkonwn
916   metadata-portion =  Analyze-Alert-Pattern (received-alert)
917 ...
918 Termination Subroutine
919 ...
```

```
1101  ...
1102  Initialization Subroutine
1103  ...
1104  //Routine to extract metadata information from the metadata portion of
      an emergency alert:
1105   metadata-portion = retrieve-metadata-portion (emergency-alert)
1106   alert-format = retrieve-alert-format (emergency-alert)
1107   alert-markers = identify-alert-markers(alert-format)
1108  for each alert-marker in alert-markers
1109       next-alert-marker = get-next-alert-marker(alert-marker)
1110       data = retrieve-data(alert-marker, next-alert-marker)
1111       if data(encoded) == true
1112            data-field[counter] = decode(data)
1113       else
1114            data-field[counter] = data
1115       increment counter
1116  next step of the For Loop
1117  ...
1118  ...
1119  Termination Subroutine
1120  ...
```

```
1301 ...
1302 Initialization Subroutine
1303 ...
1304 //Routine to determine, based on the metadata information, a set of
     keywords associated with the emergency alert:
1305 data-fields = retrieve-data-fields(metadata-information)
1306 for each data-field in data-fields
1307       words = Split(data-field)
1308       for each word in words
1309             exists-in-database = search-database (word)
1310             if exists-in-database == false
1311                   add-to-set (word)
1312             end if
1313       next step of the For Loop
1314 next step of the For Loop
1315 ...
1316 ...
1317 Termination Subroutine
1318 ...
```

1501 ...
1502 Initialization Subroutine
1503 ...
1504 //Routine to identify, based on a set of keywords, a plurality of media
    assets related to an emergency alert:
1505 set-of-keywords = retrieve-keywords()
1506 search-query = generate-search-query (set-of-keywords)
1507 initialize search-results
1508 content-sources = retrieve-content-sources()
1509 for each content-source in content-sources
1510     content-results = search-content-source(search query)
1511     if content-results <> 'null'
1512         search-results.add(content-results)
1513     end if
1514 next step of the For Loop
1515 ...
1516 ...
1517 Termination Subroutine
1518 ...

```
1701 ...
1702 Initialization Subroutine
1703 ...
1704 //Routine to generate for display a contextual menu:
1705 search-results = retrieve-search-results()
1706 initialize contextual-menu
1707 for each search-result in search-results
1708       if Display-in-Menu(search-result) == True
1709            Contextual-menu.add(search-result)
1710       end if
1711 next step of the For Loop
1712 Render (Contextual-menu)
1713 ...
1714 Termination Subroutine
1715 ...
```

```
2001 ...
2002 Initialization Subroutine
2003 ...
2004 //Routine to extract metadata information from the content portion of an
     emergency alert:
2005   alert-format = retrieve-alert-format (emergency alert)
2006   alert-markers = identify-alert-markers(alert-format)
2007   content-portion = identify-content-portion(alert-markers)
2008   if isVideo(content-portion) == true
2009       video-based-keywords = Video-Pattern-Recognition (content-
     portion)
2010   end if
2011   if isAudio(content-portion) == true
2012       audio-based-keywords = Audio-Pattern-Recognition (content-
     portion)
2013   end if
2014 ...
2015 ...
2016 Termination Subroutine
2017 ...
```

FIG. 20

SYSTEMS AND METHODS FOR PROVIDING A CONTEXTUAL MENU WITH INFORMATION RELATED TO AN EMERGENCY ALERT

BACKGROUND

Various systems are in existence today that enable users to receive emergency alerts. These systems include Integrated Public Alert and Warning System ("IPAWS"), the Emergency Alert System ("EAS"), and NOAA Weather Radio All Hazards (NWR), among others. These various emergency alert systems are configured to transmit certain emergency alerts (e.g., weather alerts, amber alerts, natural disaster alerts, etc.) to various devices (e.g., set-top boxes, cellular phones, radios, etc.). For example, the IPAWS is enabled to transmit emergency alerts to cellular phones, and the EAS is enabled to transmit emergency alerts to televisions and set-top boxes, as well as other devices.

When various devices receive emergency alerts, they are configured to present those emergency alerts to the user. After the emergency alert is presented, those devices continue to perform operations that were being performed prior to the emergency alert being received.

SUMMARY

Systems and methods are described herein for presenting, to a user, additional information related to an emergency alert when the emergency alert is received. For example, a user may be watching television when an emergency alert to notify a user of an approaching storm is generated. The originator of the emergency alert may transmit the emergency alert through the EAS, and the user's set-top box may receive the alert. A media guidance application residing on the set-top box may detect that a new emergency alert has been received and generate for display the contents of the alert. In addition, the media guidance application may determine that the emergency alert was transmitted in order to warn people of an upcoming storm.

The media guidance application may perform a search of various content sources (e.g., program listings, the Internet, etc.) for media content related to the storm. The media guidance application may present the search results in a contextual menu enabling the user to access content of the search results. For example, the contextual menu may include a link to a news article on the Internet that has additional information related to the storm. Another entry in the contextual menu may include a link to a breaking news story or a link to a weather channel where the user is able to get more information on the storm.

When the user selects one of the links, the media guidance application may generate for display more options. For example, the media guidance application may generate for display an option to tune to a channel that is transmitting the breaking news story while at the same time recording the media content or pausing the media content that the user was in the process of consuming when the emergency alert was generated. The media guidance application may also provide an option to the user not to bring up the contextual menu again, if the same emergency alert is repeated. As a result, the media guidance application enables the user not only to get quick and convenient access to vital information without having to separately search for it, but also to enjoy the convenience of being able to later finish consuming the interrupted content. In addition, the media guidance application enables the user to choose different types of content (e.g., news programs, web pages, trending topics, etc.) from different sources (e.g., broadcast media, Internet, etc.). The media guidance application also enables the user to suppress additional information related to the emergency alert in instances where the same emergency alert is repeated and the user no longer desires information about the emergency alert.

In some aspects, the media guidance application may provide additional information related to a received emergency alert in a form of a contextual menu. The media guidance application may receive the emergency alert. When the emergency alert is received, the media guidance application may identify a metadata portion of the emergency alert. The media guidance application may extract metadata information from the metadata portion of the emergency alert and determine, based on the extracted metadata information, a set of keywords associated with the emergency alert. The media guidance application may identify, based on the set of keywords, a plurality of media assets related to the emergency alert and generate for display a contextual menu that includes a plurality of user-selectable options corresponding to at least one media asset of the plurality of media assets related to the emergency alert.

In some embodiments, the media guidance application may identify a content portion of the emergency alert, extract content information from the content portion of the emergency alert, and identify the set of keywords based on the extracted content information. In some embodiments, the content information may include at least one of an audio portion and a video portion, and the media guidance application may execute audio pattern recognition against the audio portion, based on determining that the content information includes an audio portion. The media guidance application may execute video pattern recognition against the video portion based on determining that the content information includes a video portion.

In some embodiments, the media guidance application, when identifying, based on the set of keywords, the plurality of media assets related to the emergency alert, extracts from the metadata portion of the emergency alert a first textual representation of a location associated with the emergency alert and a second textual representation of an alert type of the emergency alert. The media guidance application may select a first media asset from the plurality of media assets related to the emergency alert and access textual data associated with the first media asset. The media guidance application may compare the accessed textual data associated with the first media asset with the first textual representation and the second textual representation. In some embodiments, the media guidance application may determine whether the textual data associated with the first media asset matches both the first textual representation of the second textual representation and include, in the contextual menu, a user-selectable option corresponding to the first media asset, based on both the first textual representation and the second textual representation matching the textual data associated with the first media asset.

In some embodiments, the media guidance application, when generating for display the contextual menu, extracts textual content from each media asset of the plurality of media assets related to the emergency alert. The media guidance application may compare the textual content to the set of keywords associated with the emergency alert and determine, based on the comparing, for each media asset of the plurality of media assets related to the emergency alert, a plurality of keywords that match the textual content. The media guidance application may, based on a number of the plurality of keywords meeting a predefined threshold, include the corresponding user-selectable options in the contextual menu.

In some embodiments, the media guidance application, when generating for display the contextual menu, may access trending topics on the Internet and compare the set of keywords to each trending topic. The media guidance application may include, in the contextual menu, an option to access information associated with the trending topic based on determining that a trending topic matches a threshold number of keywords in the set of keywords.

In some embodiments, the media guidance application may switch to a user-defined default content source associated with emergency alerts after a predetermined amount of time from the generation for display of the contextual menu. In some embodiments, the media guidance application may provide an option to a user to prevent the contextual menu from being displayed again based on the emergency alert.

In some embodiments, the media guidance application may generate for display a corresponding media asset based on a user selection of an option of the plurality of user selectable-options. The media guidance application may provide an option from a group of options that includes an option to record media content currently accessed by the user, an option to pause the media content currently accessed by the user, and an option to record media content that the user is currently accessing on a device different from the device that the user is currently accessing the content on.

In order to provide a contextual menu, the media guidance application may first receive the emergency alert. The emergency alert may be received from various sources. For example, the media guidance application may receive the emergency alert from a server that also provides other data for the media guidance application (e.g., program guidance data). In some embodiments, the media guidance application may receive the emergency alert directly from the source of the alert (e.g., EAS, IPAWS, etc.).

The media guidance application may then identify a metadata portion of the emergency alert. Various kinds of emergency alerts are structured in different ways. For example, an EAS alert includes a Specific Area Message Encoding ("SAME") header that contains metadata associated with the EAS alert. A Wireless Emergency Alert is transmitted in an XML format that includes a metadata portion along with the content of the alert.

The media guidance application may then extract metadata information from the metadata portion of the emergency alert. As described above, an EAS alert includes a SAME header. The media guidance application may extract information from the SAME header, such as a location associated with the emergency alert. It should be noted that the emergency alert may be associated with several locations. The media guidance application may also extract other information from the SAME header. For example, the originator of the alert (civil authorities, president, etc.) and the type of the alert (e.g., weather, amber, etc.) may be extracted from the SAME header. If the emergency alert is in an XML format, the media guidance application may use an XML parser to parse the XML file and extract information from the XML file similar to the information extracted from the SAME header.

The media guidance application may then determine, based on the extracted metadata information, a set of keywords associated with the emergency alert. For example, in the case of an EAS alert, the alert may include a location (e.g., New York State, or New York County). The media guidance application may include that location in the set of keywords associated with the alert. The media guidance application may include in the set of keywords all the textual data extracted from the metadata associated with the alert. In some embodiments, the media guidance application may only include some of the metadata in the set of keywords, but not all. For example, in the case of an EAS alert, it may not be important to include in the set of keywords the purge time associated with the alert.

The media guidance application may then identify, based on the set of keywords, a plurality of media assets related to the emergency alert. The media guidance application may perform a search of one or more sources in order to find media assets related to the emergency alert. For example, the media guidance application may use all or some of the keywords to execute a search against program listings local to the set-top box. Additionally or alternatively, the media guidance application may execute a search against a server that may contain updated program listings. For example, there may be upcoming breaking news coverage that may not be part of the program listings local to the set-top box.

The media guidance application may, additionally or alternatively, search Internet sources for media assets related to the emergency alert. For example, the media guidance application may perform a search using any search engine (e.g., Google®, Yahoo®). The media guidance application may also use custom search engines to perform the search. For example, the media guidance application may search well-known news sites using search engines provided by those sites. The media guidance application may also search social networking sites for media assets related to the emergency alert (e.g., Facebook®, Twitter®, etc.). It should be noted that the media guidance application may search other sources for media assets related to the emergency alert.

The media guidance application may then generate for display a contextual menu comprising a plurality of user-selectable options corresponding to at least one media asset of the plurality of media assets related to the emergency alert. For example, the media guidance application may generate for display an overlay on top of media content containing the contextual menu. The menu itself may include links that enable a user to access the media assets found by the media guidance application. The media guidance application may generate for display the contextual menu in such a way that the links to the media content include the title of the corresponding media assets.

In some embodiments, the media guidance application may identify a content portion of the emergency alert. The content portion of the emergency alert may include textual data, audio data, video data, image data, or any combination of the three. If the emergency alert is in a form of a digital file, the file header may include the boundaries of the content portion of the alert. The header may also identify the type of the content (e.g., video, audio, image, textual, or a combination of the three).

The media guidance application may then extract content information from the content portion of the emergency alert. For example, if the emergency alert is in a form of a digital file, the media guidance application may extract the bits associated with content portion of the emergency alert, based on boundaries indicated in a header of the file. If the emergency alert is an EAS alert, the media guidance application may use blank one-second audio intervals to determine the boundaries of the content portion of the emergency alert. The media guidance application may then extract the information between the blank one-second audio intervals from the EAS alert.

The media guidance application may then identify the set of keywords based on the extracted content information. For example, if the extracted content information is textual, the media guidance application may parse through the textual data to break that data up into strings. The media guidance application may then add the strings into the set of keywords. In some embodiments, the media guidance application may not add all the strings into the set of keywords. For example, words like "for," "a," "the," as well as others may not be important for a search query. Thus, the media guidance application may skip those words when adding the rest of the textual data into the set of keywords.

In some embodiments, the content information may include at least one of an audio portion and a video portion. In those instances, the media guidance application may execute audio pattern recognition against the audio portion based on determining that the content information includes the audio portion. The media guidance application may include audio pattern recognition routines that may enable the media guidance application to extract textual data from audio data. For example, if the emergency alert contains a speech by the President of the United States, the media guidance application may perform a transcription of that speech using audio pattern recognition routines.

Similarly, the media guidance application may include video pattern recognition routines that may enable the media guidance application to translate video signals into textual data. For example, the emergency alert may include a video of a tornado. A sign may also be visible in the video with a name of a town. The media guidance application may analyze the video and add "tornado" and the name of the town into the set of keywords.

In some embodiments, the media guidance application may, when identifying based on a set of keywords a plurality of media assets related to an emergency alert, first extract from the metadata portion of the emergency alert a first textual representation of a location associated with the emergency alert and a second textual representation of an alert type of the emergency alert. For example, if the media guidance application determines that the emergency alert is an EAS alert, the media guidance application may extract from a metadata field of the EAS alert the alert type (e.g., blizzard warning, flash flood warning, etc.) of the emergency alert. The media guidance application may also extract, from the EAS alert, a location (e.g., New York County) associated with the EAS alert. It should be noted that an EAS alert may be associated with a plurality of locations. In those instances, every location may be extracted from the emergency alert. However, in some embodiments, the media guidance application may determine one location of the plurality that is closest to the user's location.

The media guidance application may select a first media asset from the plurality of media assets related to the emergency alert. The media guidance application may then access textual data associated with the first media asset. For example, if the media guidance application selects an Internet web page as the first media asset, the media guidance application may extract the text of the web page from the combination of HTML code and text. In an example where the media guidance application selects a news break as the first media asset, the media guidance application may run video and audio pattern analysis to determine textual data associated with the first media asset. Alternatively or additionally, the media guidance application may access a program listing corresponding to the news break as textual data associated with the first media asset.

The media guidance application may then compare the accessed textual data associated with the first media asset with the first textual representation and the second textual representation. The media guidance application may execute a straight string comparison between the textual data and the first textual representation and the second textual representation. In some embodiments, the media guidance application may expand the comparison to include other locations within the location in the first textual representation. For example, if the media guidance application determines that the location in the first textual representation is New York State, the media guidance application may compare, in addition to New York State, counties (e.g., Kings, Bronx, etc.) within the state in order to find matches.

In some embodiments, the media guidance application may, when generating for display the contextual menu, first determine whether the textual data associated with the first media asset matches both the first textual representation and the second textual representation. For example, the media guidance application may be configured to only generate for display media assets where both the location and the alert type match information within the media asset. In those instances, the media guidance application may discard any media assets where both the location and alert type do not match.

The media guidance application may include, in the contextual menu, a user-selectable option corresponding to the first media asset based on both the first textual representation and the second textual representation matching the textual data associated with the first media asset. For example, if the media guidance application determines that a specific web page on the Internet includes text that matches the location of the emergency alert (e.g., New York State) and also includes text describing the alert type (e.g., flash flood warning), the media guidance application may add a user-selectable option to the contextual menu corresponding to the media asset.

In some embodiments, the media guidance application may, when generating a contextual menu, extract textual content from each media asset of the plurality of media assets related to the emergency alert. For example, if the media guidance application determines that a media asset of the plurality of media assets related to the emergency alert is an Internet web page, the media guidance application may extract the text of the webpage from the combination of text and HTML code. If, for example, the media guidance application determines that the media asset includes audio and/or video, the media guidance application may use audio and/or video pattern analysis to extract textual data from the media asset.

The media guidance application may then compare the textual content to the set of keywords associated with the emergency alert. For example, the media guidance application may iterate through each word in the set of keywords and search for the same word within the textual content that was extracted from the media asset. In some embodiments, the media guidance application may compare the textual content not only to words in the set of keywords, but also to words that have a similar meaning to the words in the set of keywords. For example, if the media guidance application determines that a keyword "blizzard" is to be compared with the textual content from a media asset, the media guidance application may also compare terms such as "winter storm," "storm," "heavy snow," to the textual content. It should be noted that these associated terms may be stored in a database. The media guidance application may, additionally or alternatively, use partial matching in the comparison of the textual content. Specifically, the media guidance application may, while comparing a keyword to the textual data, search for words in the textual data that partially match the keyword. For example, if the media guidance application determines that a keyword "storm" is to be compared with the textual content, the media guidance application may also determine a match if a word "stormy" or "storms" is found within the textual content.

The media guidance application may then determine, based on the comparing for each media asset of the plurality of media assets related to the emergency alert, a plurality of keywords that match the textual content. For example, the media guidance application may track whether each word in the set of keywords matches the textual content. In some embodiments, the media guidance application may track the number of times that each word in the set of keywords appears in the textual content.

In some embodiments, the media guidance application may, based on a number of the plurality of keywords meeting a predefined threshold, include the corresponding user-selectable option in the contextual menu. For example, the media guidance application may be configured to include an option in the contextual menu for a media asset where at least 50% of keywords in the set of keywords match the textual content. In some embodiments, the media guidance application may be configured to include the option in the contextual menu if each of the keywords matches at least once. It should be noted that other thresholds are possible in various instances.

Trending topics on the Internet may provide information about emergency alerts. In some embodiments, the media guidance application may, when generating for display the contextual menu, access trending topics on the Internet. For example, the media guidance application may access Internet websites such as Twitter and Yahoo News to get access to trending topics on those websites. The media guidance application may then compare a set of keywords derived from an emergency alert to each trending topic. For example, the media guidance application may perform simple string comparison to the title of the trending topic. The media guidance application may include, in the contextual menu, an option to access information associated with the trending topic based on determining that a trending topic matches a threshold number (e.g., 10%, three keywords, the whole set) of keywords in the set of keywords.

In some embodiments, the media guidance application may switch to a user-defined default content source associated with emergency alerts, after a predetermined amount of time has elapsed from the generation for display of the contextual menu. For example, the media guidance application may be configured to keep the contextual menu displayed for a specific amount time (e.g., 20 seconds). The media guidance application may also be configured with a specific channel to switch to when that time elapses. Specifically, the media guidance application may be configured to switch to channel five (a local news channel) after 20 seconds of displaying the context menu with no input from the user. In some embodiments, the channel may be configured by the user. However, in other embodiments, the media guidance application may determine the channel based on the user's location and the locality of the channel. For example, if Channel 12 is a local news channel for residents of Brooklyn, N.Y., the media guidance application may set that channel to be a default channel.

In some embodiments, the media guidance application may provide an option to a user to prevent the contextual menu from being displayed again based on the emergency alert. For example, the media guidance application may generate for display as part of the contextual menu an area that a user may select to indicate that the user no longer wishes to see the contextual menu when the emergency alert is repeated. In some embodiments, if the user has selected one of the user-selectable options from the contextual menu, the media guidance application may determine that the user is aware of the related information about the emergency alert and does not need further related information. The media guidance application may then stop generating for display further contextual menus for the same emergency alert when the emergency alert is repeated.

In some embodiments, the media guidance application may generate for display a corresponding media asset based on a user-selection of an option of the plurality of user-selectable options. For example, if the media guidance application detects a user selection of a breaking news story, the media guidance application may tune to a channel that is transmitting the breaking news story. In another example, the media guidance application may detect a user selection of an Internet website. In response, the media guidance application may generate for display a web browsing application and navigate to the Internet website selected by the user.

The media guidance application may further provide an option to the user to record media content currently accessed by the user, an option to pause the media content currently accessed by the user, and an option to record the media content that the user is currently accessing on a device different from the device that the user is currently accessing the content on. For example, the media guidance application may be residing on a set-top box that has DVR capabilities. In those instances, the media guidance application may generate for display options to record and pause the content currently being consumed. In another example, the media guidance application may be residing on a set-top box that does not include DVR capabilities, but may be connected to another media guidance application that resides on a set-top box that includes DVR capabilities. In those instances, the media guidance application may instruct the second device to record the media content being currently consumed.

In some embodiments, the media guidance application may enable the user to access media content related to the emergency alert on a second screen device. For example, if the media guidance application residing on a set-top box is able to communicate with a media guidance application residing on a tablet, the media guidance application residing on the set-top box may instruct the media guidance application on the tablet to generate for display the related media asset on that tablet.

BRIEF DESCRIPTION OF THE DRAWINGS

FIG. 7 depicts illustrative pseudo-code involved in receiving an emergency alert, in accordance with some embodiments of this disclosure;

FIG. 9 depicts illustrative pseudo-code involved in identifying a metadata portion of an emergency alert, in accordance with some embodiments of this disclosure;

FIG. 11 depicts illustrative pseudo-code involved in extracting metadata information from the metadata portion of an emergency alert, in accordance with some embodiments of this disclosure;

FIG. 13 depicts illustrative pseudo-code involved in determining, based on the metadata information, a set of keywords associated with an emergency alert, in accordance with some embodiments of this disclosure;

FIG. 15 depicts illustrative pseudo-code involved in identifying, based on the set of keywords, a plurality of media assets related to an emergency alert, in accordance with some embodiments of this disclosure;

FIG. 17 depicts illustrative pseudo-code involved in generating for display a contextual menu that includes a plurality of user-selectable options corresponding to at least one media asset of the plurality of media assets related to the emergency alert, in accordance with some embodiments of this disclosure;

FIG. 20 depicts illustrative pseudo-code involved in determining, based on a content portion of an emergency alert, a set of keywords associated with the emergency alert, in accordance with some embodiments of this disclosure.

DESCRIPTION

Figure 1:
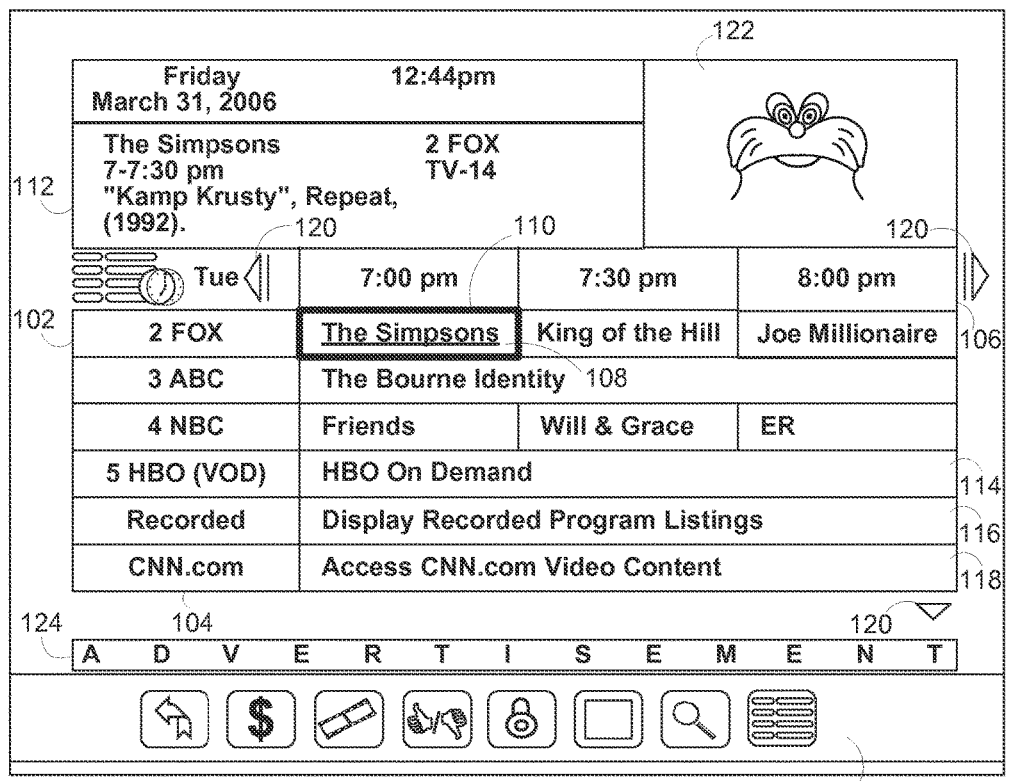
FIG. 1 shows an illustrative embodiment of a display screen that may be used to provide media guidance application listings and other media guidance information, in accordance with some embodiments of the disclosure.

The amount of content available to users in any given content delivery system can be substantial. Consequently, many users desire a form of media guidance through an interface that allows users to efficiently navigate content selections and easily identify content that they may desire. An application that provides such guidance is referred to herein as an interactive media guidance application or, sometimes, a media guidance application or a guidance application.

Interactive media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content. As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, advertisements, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

The media guidance application and/or any instructions for performing any of the embodiments discussed herein may be encoded on computer readable media. Computer readable media includes any media capable of storing data. The computer readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory ("RAM"), etc.

With the advent of the Internet, mobile computing, and high-speed wireless networks, users are accessing media on user equipment devices on which they traditionally did not. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below.

One of the functions of the media guidance application is to provide media guidance data to users. As referred to herein, the phrase "media guidance data" or "guidance data" should be understood to mean any data related to content or data used in operating the guidance application. For example, the guidance data may include program information, guidance application settings, user preferences, user profile information, media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), advertisement information (e.g., text, images, media clips, etc.), on-demand information, blogs, websites, and any other type of guidance data that is helpful for a user to navigate among and locate desired content selections.

Figure 2:
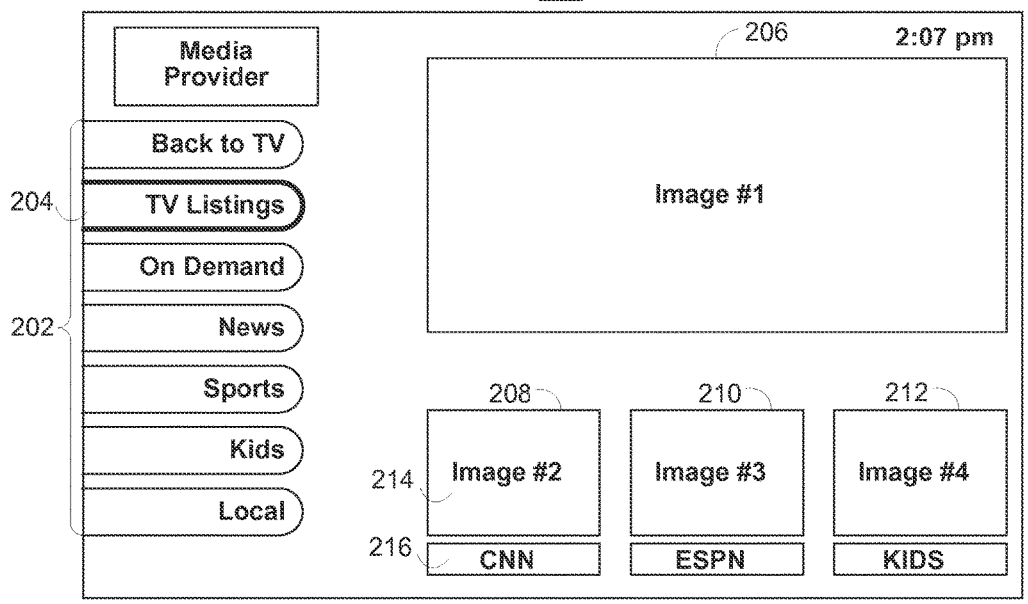
FIG. 2 shows another illustrative embodiment of a display screen that may be used to provide media guidance application listings, in accordance with some embodiments of the disclosure.

FIGS. 1-2 show illustrative display screens that may be used to provide media guidance data. The display screens shown in FIGS. 1-2 may be implemented on any suitable user equipment device or platform. While the displays of FIGS. 1-2 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria.

FIG. 1 shows illustrative grid of a program listings display 100 arranged by time and channel that also enables access to different types of content in a single display. Display 100 may include grid 102 with: (1) a column of channel/content type identifiers 104, where each channel/content type identifier (which is a cell in the column) identifies a different channel or content type available; and (2) a row of time identifiers 106, where each time identifier (which is a cell in the row) identifies a time block of programming. Grid 102 also includes cells of program listings, such as program listing 108, where each listing provides the title of the program provided on the listing's associated channel and time. With a user input device, a user can select program listings by moving highlight region 110. Information relating to the program listing selected by highlight region 110 may be provided in program information region 112. Region 112 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L.P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet website or other Internet access (e.g. FTP).

Grid 102 may provide media guidance data for non-linear programming including on-demand listing 114, recorded content listing 116, and Internet content listing 118. A display combining media guidance data for content from different types of content sources is sometimes referred to as a "mixed-media" display. Various permutations of the types of media guidance data that may be displayed that are different than display 100 may be based on user selection or guidance application definition (e.g., a display of only recorded and broadcast listings, only on-demand and broadcast listings, etc.). As illustrated, listings 114, 116, and 118 are shown as spanning the entire time block displayed in grid 102 to indicate that selection of these listings may provide access to a display dedicated to on-demand listings, recorded listings, or Internet listings, respectively. In some embodiments, listings for these content types may be included directly in grid 102. Additional media guidance data may be displayed in response to the user selecting one of the navigational icons 120. (Pressing an arrow key on a user input device may affect the display in a similar manner as selecting navigational icons 120.)

Display 100 may also include video region 122, advertisement 124, and options region 126. Video region 122 may allow the user to view and/or preview programs that are currently available, will be available, or were available to the user. The content of video region 122 may correspond to, or be independent from, one of the listings displayed in grid 102. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Advertisement 124 may provide an advertisement for content that, depending on a viewer's access rights (e.g., for subscription programming), is currently available for viewing, will be available for viewing in the future, or may never become available for viewing, and may correspond to or be unrelated to one or more of the content listings in grid 102. Advertisement 124 may also be for products or services related or unrelated to the content displayed in grid 102. Advertisement 124 may be selectable and provide further information about content, provide information about a product or a service, enable purchasing of content, a product, or a service, provide content relating to the advertisement, etc. Advertisement 124 may be targeted based on a user's profile/preferences, monitored user activity, the type of display provided, or on other suitable targeted advertisement bases.

While advertisement 124 is shown as rectangular or banner shaped, advertisements may be provided in any suitable size, shape, and location in a guidance application display. For example, advertisement 124 may be provided as a rectangular shape that is horizontally adjacent to grid 102. This is sometimes referred to as a panel advertisement. In addition, advertisements may be overlaid over content or a guidance application display or embedded within a display. Advertisements may also include text, images, rotating images, video clips, or other types of content described above. Advertisements may be stored in a user equipment device having a guidance application, in a database connected to the user equipment, in a remote location (including streaming media servers), or on other storage means, or a combination of these locations. Providing advertisements in a media guidance application is discussed in greater detail in, for example, Knudson et al., U.S. Patent Application Publication No. 2003/0110499, filed Jan. 17, 2003; Ward, III et al. U.S. Pat. No. 6,756,997, issued Jun. 29, 2004; and Schein et al. U.S. Pat. No. 6,388,714, issued May 14, 2002, which are hereby incorporated by reference herein in their entireties. It will be appreciated that advertisements may be included in other media guidance application display screens of the embodiments described herein. In some embodiments, instead of the advertisement, the media guidance application may generate for display data associated with a received emergency alert.

Options region 126 may allow the user to access different types of content, media guidance application displays, and/or media guidance application features. Options region 126 may be part of display 100 (and other display screens described herein), or may be invoked by a user by selecting an on-screen option or pressing a dedicated or assignable button on a user input device. The selectable options within options region 126 may concern features related to program listings in grid 102 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other websites on the Internet the user accesses, such as www.allrovi.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 4. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Another display arrangement for providing media guidance is shown in FIG. 2. Video mosaic display 200 includes selectable options 202 for content information organized based on content type, genre, and/or other organization criteria. In display 200, television listings option 204 is selected, thus providing listings 206, 208, 210, and 212 as broadcast program listings. In display 200 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 208 may include more than one portion, including media portion 214 and text portion 216. Media portion 214 and/or text portion 216 may be selectable to view content in full-screen or to view information related to the content displayed in media portion 214 (e.g., to view listings for the channel that the video is displayed on).

The listings in display 200 are of different sizes (i.e., listing 206 is larger than listings 208, 210, and 212), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Nov. 12, 2009, which is hereby incorporated by reference herein in its entirety.

Figure 3:
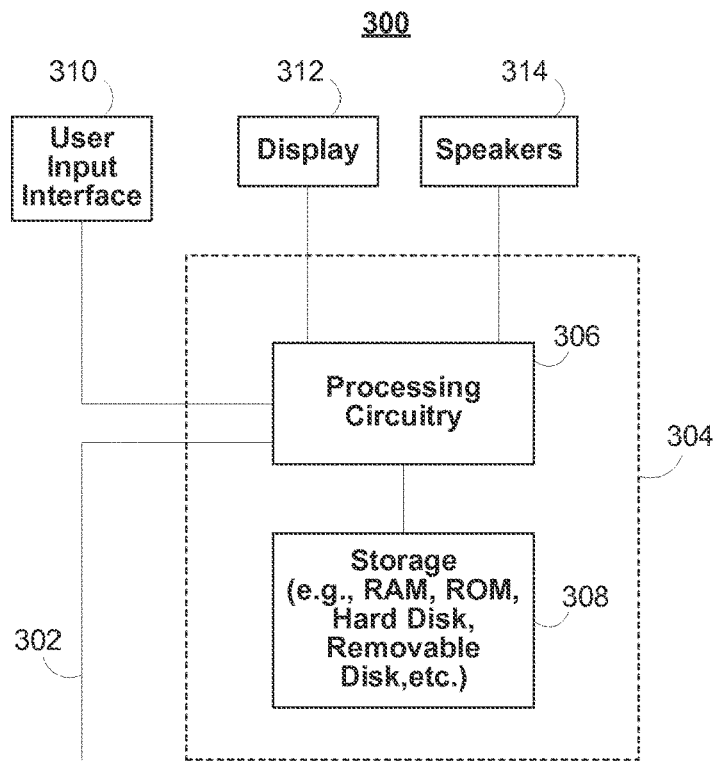
FIG. 3 is a block diagram of an illustrative device in accordance with some embodiments of the disclosure.

Users may access content and the media guidance application (and its display screens described above and below) from one or more of their user equipment devices. FIG. 3 shows a generalized embodiment of illustrative user equipment device 300. More specific implementations of user equipment devices are discussed below in connection with FIG. 4. User equipment device 300 may receive content and data via input/output (hereinafter "I/O") path 302. I/O path 302 may provide content (e.g., broadcast programming, on-demand programming, Internet content, content available over a local area network (LAN) or wide area network (WAN), and/or other content) and data to control circuitry 304, which includes processing circuitry 306 and storage 308. Control circuitry 304 may be used to send and receive commands, requests, and other suitable data using I/O path 302. In some embodiments, the media guidance application may receive emergency alerts via I/O path 302. I/O path 302 may connect control circuitry 304 (and specifically processing circuitry 306) to one or more communications paths (described below). I/O functions may be provided by one or more of these communications paths, but are shown as a single path in FIG. 3 to avoid overcomplicating the drawing.

Control circuitry 304 may be based on any suitable processing circuitry such as processing circuitry 306. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or super-computer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 304 executes instructions for a media guidance application stored in memory (i.e., storage 308). Specifically, control circuitry 304 may be instructed by the media guidance application to perform the functions discussed above and below. For example, the media guidance application may provide instructions to control circuitry 304 to generate the media guidance displays. In some implementations, any action performed by control circuitry 304 may be based on instructions received from the media guidance application.

In client-server based embodiments, control circuitry 304 may include communications circuitry suitable for communicating with a guidance application server or other networks or servers. The instructions for carrying out the above mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 4). In addition, communications circuitry may include circuitry that enables peer-to-peer communication of user equipment devices, or communication of user equipment devices in locations remote from each other (described in more detail below).

Memory may be an electronic storage device provided as storage 308 that is part of control circuitry 304. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 308 may be used to store various types of content described herein as well as media guidance data described above. Nonvolatile memory may also be used (e.g., to launch a boot-up routine and other instructions). Cloud-based storage, described in relation to FIG. 4, may be used to supplement storage 308 or instead of storage 308.

Control circuitry 304 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 304 may also include scaler circuitry for upconverting and downconverting content into the preferred output format of the user equipment 300. Circuitry 304 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 308 is provided as a separate device from user equipment 300, the tuning and encoding circuitry (including multiple tuners) may be associated with storage 308.

A user may send instructions to control circuitry 304 using user input interface 310. User input interface 310 may be any suitable user interface, such as a remote control, mouse, trackball, keypad, keyboard, touch screen, touchpad, stylus input, joystick, voice recognition interface, or other user input interfaces. Display 312 may be provided as a stand-alone device or integrated with other elements of user equipment device 300. For example, display 312 may be a touchscreen or touch-sensitive display. In such circumstances, user input interface 310 may be integrated with or combined with display 312. Display 312 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 312 may be HDTV-capable. In some embodiments, display 312 may be a 3D display, and the interactive media guidance application and any suitable content may be displayed in 3D. A video card or graphics card may generate the output to the display 312. In some embodiments, display 312 may be used to display the emergency alert and the contextual menu. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 304. The video card may be integrated with the control circuitry 304. In some embodiments, the video card may be used to render the contextual menu and transmit the rendered contextual menu to display 312. Speakers 314 may be provided as integrated with other elements of user equipment device 300 or may be stand-alone units. The audio component of videos and other content displayed on display 312 may be played through speakers 314. In some embodiments, the audio may be distributed to a receiver (not shown), which processes and outputs the audio via speakers 314.

The guidance application may be implemented using any suitable architecture. For example, it may be a stand-alone application wholly-implemented on user equipment device 300. In such an approach, instructions of the application are stored locally (e.g., in storage 308), and data for use by the application is downloaded on a periodic basis (e.g., from an out-of-band feed, from an Internet resource, or using another suitable approach). Control circuitry 304 may retrieve instructions of the application from storage 308 and process the instructions to generate any of the displays discussed herein. Based on the processed instructions, control circuitry 304 may determine what action to perform when input is received from input interface 310. For example, movement of a cursor on a display up/down may be indicated by the processed instructions when input interface 310 indicates that an up/down button was selected.

In some embodiments, the media guidance application is a client-server based application. Data for use by a thick or thin client implemented on user equipment device 300 is retrieved on-demand by issuing requests to a server remote to the user equipment device 300. In one example of a client-server based guidance application, control circuitry 304 runs a web browser that interprets web pages provided by a remote server. For example, the remote server may store the instructions for the application in a storage device. The remote server may process the stored instructions using circuitry (e.g., control circuitry 304) and generate the displays discussed above and below. The client device may receive the displays generated by the remote server and may display the content of the displays locally on equipment device 300. This way, the processing of the instructions is performed remotely by the server while the resulting displays are provided locally on equipment device 300. Equipment device 300 may receive inputs from the user via input interface 310 and transmit those inputs to the remote server for processing and generating the corresponding displays. For example, equipment device 300 may transmit a communication to the remote server indicating that an up/down button was selected via input interface 310. The remote server may process instructions in accordance with that input and generate a display of the application corresponding to the input (e.g., a display that moves a cursor up/down). The generated display is then transmitted to equipment device 300 for presentation to the user.

In some embodiments, the media guidance application is downloaded and interpreted or otherwise run by an interpreter or virtual machine (run by control circuitry 304). In some embodiments, the guidance application may be encoded in the ETV Binary Interchange Format (EBIF), received by control circuitry 304 as part of a suitable feed, and interpreted by a user agent running on control circuitry 304. For example, the guidance application may be an EBIF application. In some embodiments, the guidance application may be defined by a series of JAVA-based files that are received and run by a local virtual machine or other suitable middleware executed by control circuitry 304. In some of such embodiments (e.g., those employing MPEG-2 or other digital media encoding schemes), the guidance application may be, for example, encoded and transmitted in an MPEG-2 object carousel with the MPEG audio and video packets of a program.

Figure 4:
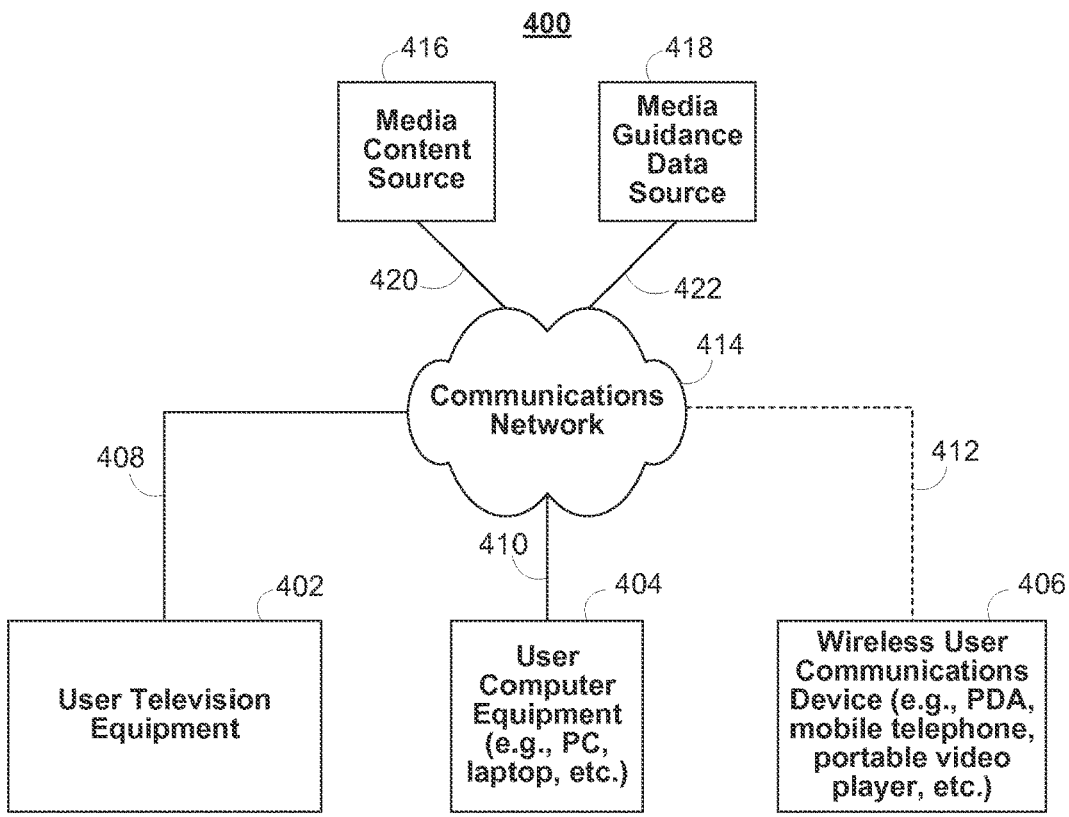
FIG. 4 is a block diagram of an illustrative media system in accordance with some embodiments of the disclosure.

User equipment device 300 of FIG. 3 can be implemented in system 400 of FIG. 4 as user television equipment 402, user computer equipment 404, wireless user communications device 406, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 3 may not be classified solely as user television equipment 402, user computer equipment 404, or a wireless user communications device 406. For example, user television equipment 402 may, like some user computer equipment 404, be Internet-enabled allowing for access to Internet content, while user computer equipment 404 may, like some television equipment 402, include a tuner allowing for access to television programming. The media guidance application may have the same layout on various different types of user equipment or may be tailored to the display capabilities of the user equipment. For example, on user computer equipment 404, the guidance application may be provided as a website accessed by a web browser. In another example, the guidance application may be scaled down for wireless user communications devices 406.

In system 400, there is typically more than one of each type of user equipment device but only one of each is shown in FIG. 4 to avoid overcomplicating the drawing. In addition, each user may utilize more than one type of user equipment device and also more than one of each type of user equipment device.

In some embodiments, a user equipment device (e.g., user television equipment 402, user computer equipment 404, wireless user communications device 406) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the website www.allrovi.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 414. Namely, user television equipment 402, user computer equipment 404, and wireless user communications device 406 are coupled to communications network 414 via communications paths 408, 410, and 412, respectively. Communications network 414 may be one or more networks including the Internet, a mobile phone network, mobile voice or data network (e.g., a 4G or LTE network), cable network, public switched telephone network, or other types of communications network or combinations of communications networks. Paths 408, 410, and 412 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 412 is drawn with dotted lines to indicate that in the exemplary embodiment shown in FIG. 4 it is a wireless path and paths 408 and 410 are drawn as solid lines to indicate they are wired paths (although these paths may be wireless paths, if desired). Communications with the user equipment devices may be provided by one or more of these communications paths, but are shown as a single path in FIG. 4 to avoid overcomplicating the drawing.

Although communications paths are not drawn between user equipment devices, these devices may communicate directly with each other via communication paths, such as those described above in connection with paths 408, 410, and 412, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 414.

System 400 includes content source 416 and media guidance data source 418 coupled to communications network 414 via communication paths 420 and 422, respectively. Paths 420 and 422 may include any of the communication paths described above in connection with paths 408, 410, and 412. Communications with the content source 416 and media guidance data source 418 may be exchanged over one or more communications paths, but are shown as a single path in FIG. 4 to avoid overcomplicating the drawing. In addition, there may be more than one of each of content source 416 and media guidance data source 418, but only one of each is shown in FIG. 4 to avoid overcomplicating the drawing. (The different types of each of these sources are discussed below.) If desired, content source 416 and media guidance data source 418 may be integrated as one source device. Although communications between sources 416 and 418 with user equipment devices 402, 404, and 406 are shown as through communications network 414, in some embodiments, sources 416 and 418 may communicate directly with user equipment devices 402, 404, and 406 via communication paths (not shown) such as those described above in connection with paths 408, 410, and 412. In some embodiments, the originator of an emergency alert may transmit the emergency alert to media content source 416 or media guidance data source 418. The media guidance application may then receive the emergency alert from media content source 416 or media guidance data source 418.

Content source 416 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 416 may be the originator of content (e.g., a television broadcaster, a Webcast provider, etc.) or may not be the originator of content (e.g., an on-demand content provider, an Internet provider of content of broadcast programs for downloading, etc.). Content source 416 may include cable sources, satellite providers, on-demand providers, Internet providers, over-the-top content providers, or other providers of content. Content source 416 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 418 may provide media guidance data, such as the media guidance data described above. Media guidance data may be provided to the user equipment devices using any suitable approach. In some embodiments, the guidance application may be a stand-alone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 418 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 418 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 418 may provide user equipment devices 402, 404, and 406 the media guidance application itself or software updates for the media guidance application.

In some embodiments, the media guidance data may include viewer data. For example, the viewer data may include current and/or historical user activity information (e.g., what content the user typically watches, what times of day the user watches content, whether the user interacts with a social network, at what times the user interacts with a social network to post information, what types of content the user typically watches (e.g., pay TV or free TV), mood, brain activity information, etc.). The media guidance data may also include subscription data. For example, the subscription data may identify to which sources or services a given user subscribes and/or to which sources or services the given user has previously subscribed but later terminated access (e.g., whether the user subscribes to premium channels, whether the user has added a premium level of services, whether the user has increased Internet speed). In some embodiments, the viewer data and/or the subscription data may identify patterns of a given user for a period of more than one year. The media guidance data may include a model (e.g., a survivor model) used for generating a score that indicates a likelihood a given user will terminate access to a service/source. For example, the media guidance application may process the viewer data with the subscription data using the model to generate a value or score that indicates a likelihood of whether the given user will terminate access to a particular service or source. In particular, a higher score may indicate a higher level of confidence that the user will terminate access to a particular service or source. Based on the score, the media guidance application may generate promotions and advertisements that entice the user to keep the particular service or source indicated by the score as one to which the user will likely terminate access.

Media guidance applications may be, for example, stand-alone applications implemented on user equipment devices. For example, the media guidance application may be implemented as software or a set of executable instructions which may be stored in storage 308, and executed by control circuitry 304 of a user equipment device 300. In some embodiments, media guidance applications may be client-server applications where only a client application resides on the user equipment device, and server application resides on a remote server. For example, media guidance applications may be implemented partially as a client application on control circuitry 304 of user equipment device 300 and partially on a remote server as a server application (e.g., media guidance data source 418) running on control circuitry of the remote server. When executed by control circuitry of the remote server (such as media guidance data source 418), the media guidance application may instruct the control circuitry to generate the guidance application displays and transmit the generated displays to the user equipment devices. The server application may instruct the control circuitry of the media guidance data source 418 to transmit data for storage on the user equipment. The client application may instruct control circuitry of the receiving user equipment to generate the guidance application displays.

Content and/or media guidance data delivered to user equipment devices 402, 404, and 406 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 400 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 4.

In one approach, user equipment devices may communicate with each other within a home network. User equipment devices can communicate with each other directly via short-range point-to-point communication schemes described above, via indirect paths through a hub or other similar device provided on a home network, or via communications network 414. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. Patent Publication No. 2005/0251827, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 416 to access content. Specifically, within a home, users of user television equipment 402 and user computer equipment 404 may access the media guidance application to navigate among and locate desirable content. Users may also access the media guidance application outside of the home using wireless user communications devices 406 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 414. These cloud resources may include one or more content sources 416 and one or more media guidance data sources 418. In addition or in the alternative, the remote computing sites may include other user equipment devices, such as user television equipment 402, user computer equipment 404, and wireless user communications device 406. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 404 or wireless user communications device 406 having content capture feature. Alternatively, the user can first transfer the content to a user equipment device, such as user computer equipment 404. The user equipment device storing the content uploads the content to the cloud using a data transmission service on communications network 414. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 3.

As referred herein, the term "in response to" refers to initiated as a result of. For example, a first action being performed in response to another action may include interstitial steps between the first action and the second action. As referred herein, the term "directly in response to" refers to caused by. For example, a first action being performed directly in response to another action may not include interstitial steps between the first action and the second action.

Figure 5:
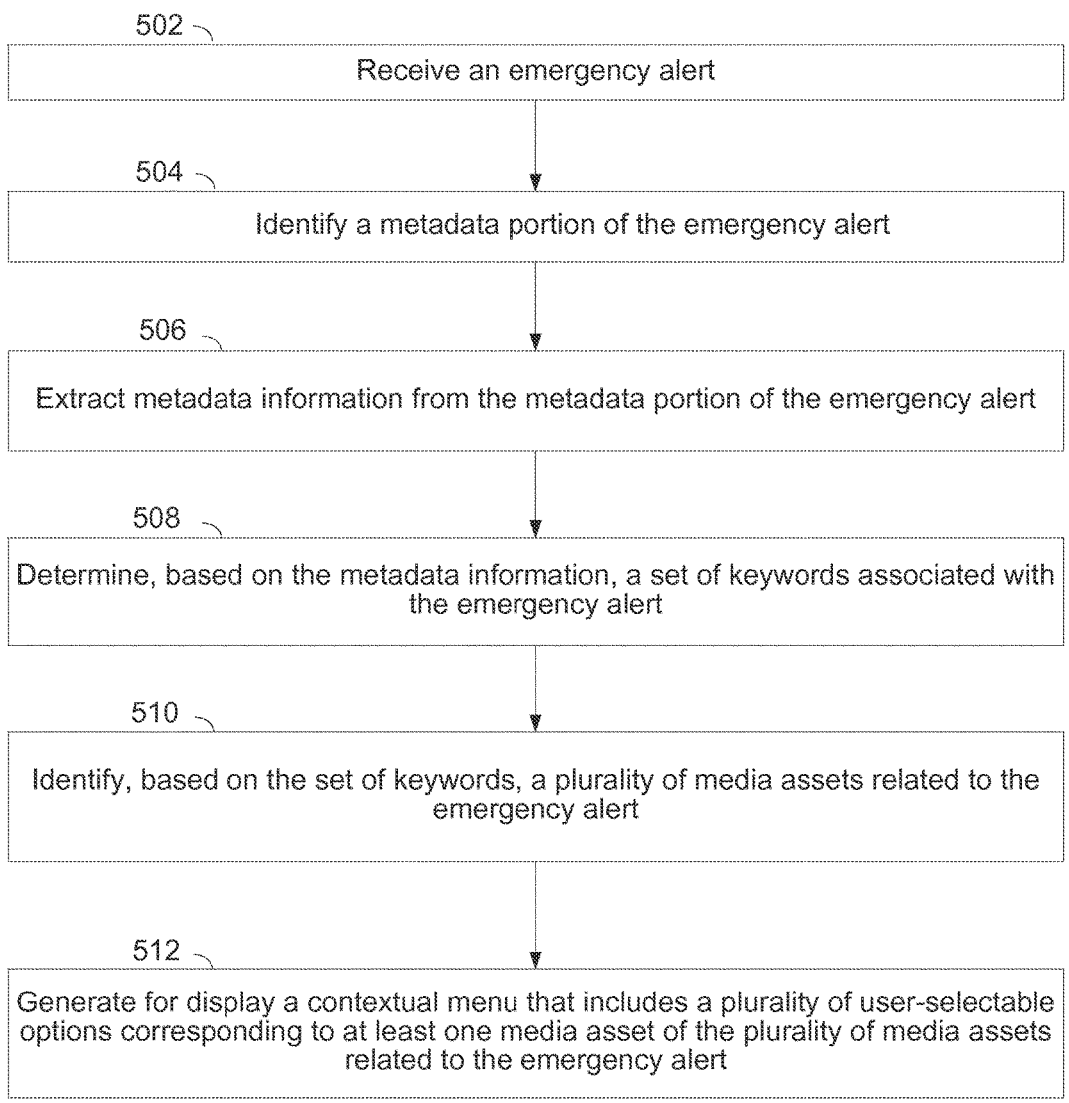
FIG. 5 depicts an illustrative process involved in generating for display a contextual menu, in accordance with some embodiments of this disclosure.

Process 500 of FIG. 5 illustrates one possible process to generate for display a contextual menu. As referred to herein, the term "contextual menu" refers to a generated menu that includes user-selectable indications of media assets or other information related to a received emergency alert. At step 502, the media guidance application receives (e.g., via control circuitry 304) an emergency alert. As described above, the emergency alert may be generated by various entities. In some embodiments, the emergency alert may be directly received by the media guidance application from an originator of the emergency alert. In some embodiments, the emergency alert may be first received by a remote server (e.g., at media content source 416 and/or media guidance data source 418). The media guidance application may then receive the emergency alert from media guidance content source 416 and/or from media guidance data source 418. The media guidance application may receive the emergency alert using processing circuitry 306 and store the alert in storage 308.

Figure 6:
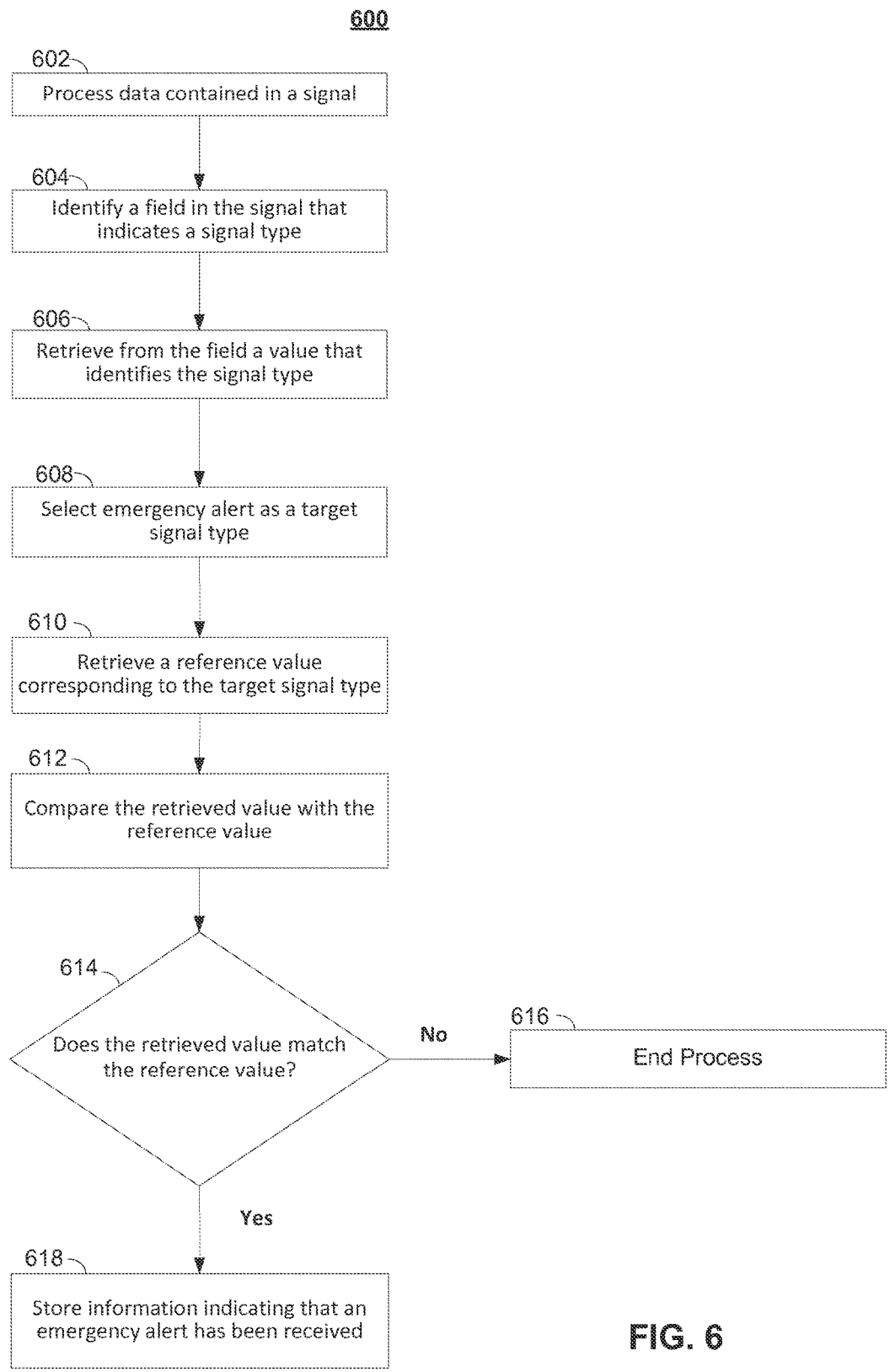
FIG. 6 depicts an illustrative process involved in receiving an emergency alert, in accordance with some embodiments of this disclosure.

FIG. 6 illustrates one way that the media guidance application may receive the emergency alert. In some embodiments, process 600 may be encoded onto a non-transitory storage medium (e.g., storage device 308) as a set of instructions to be decoded and executed by processing circuitry (e.g., processing circuitry 306). Processing circuitry may in turn provide instructions to other sub-circuits contained within control circuitry 304, such as the tuning, video-generating, encoding, decoding, encrypting, decrypting, scaling, analog/digital conversion circuitry, and the like.

At step 602, the media guidance application processes (e.g., via control circuitry 304) data contained in a signal. The media guidance application may receive the signal via I/O path 302. The signal may be received from media content source 416, media guidance data source 418 or the signal originator. It should be noted that the signal may be received from any intermediary server that is not the originator. For example, if the media guidance application resides on a device connected via the cellular network, the media guidance application may receive the signal from a cellular tower.

At step 604, the media guidance application identifies (e.g., via control circuitry 304) a field in the signal that indicates the signal type. Several signal types are possible, e.g., new program listing data available, emergency alert, etc.

At step 606, the media guidance application retrieves (e.g., via control circuitry 304) from the field a value that identifies the signal type. For example, the media guidance application may retrieve a specific value for a specific signal type. An emergency alert signal type may have a different value than a signal type informing the system of the availability of new program listing data. For example, different signal types may have different associated values that identify the signal types. Specifically, an emergency alert may have a signal type value of 1 and availability of new program listing data may have a signal type value of 2. It should be noted that signal type values may be alphanumeric, binary or any other values that may enable the system to differentiate between different signal types.

At step 608, the media guidance application selects (e.g., via control circuitry 304) an emergency alert as a target signal type. The media guidance application may iterate through different stored (e.g., in storage 308) target signal types in order to find a target signal type corresponding to an emergency alert. For example, the media guidance application may have access to data structures that store various signal types. The media guidance application may access each data structure to determine a signal type associated with any emergency alert received.

At step 610, the media guidance application retrieves (e.g., via control circuitry 304) a reference value corresponding to the target signal type. For example, values corresponding to different target signal types may uniquely identify those target signal types. Thus, an emergency alert would have a target signal type value that is different from the target signal type value of a notification of availability of new program listings. The media guidance application may retrieve the unique value corresponding to an emergency alert signal type. As mentioned above, a signal type associated with an emergency alert may have an associated alphanumeric value (e.g., EM1). The signal that is received may include various values associated with the corresponding signal types. Thus, if the received signal includes a value of EM1, then the system is able to determine the type of signal as an emergency alert by matching the "EM1" value from the received signal with the "EM1" value from the target signal type.

At step 612, the media guidance application compares (e.g., via control circuitry 304) the retrieved value with the reference value. In some embodiments, the two values may be strings; thus, the media guidance application may perform a straight string comparison. In some embodiments, the two values may be binary or hexadecimal values. In those embodiments, the media guidance application may also perform a numerical comparison. In yet some embodiments, the values may be in different formats. For example, one value may be a string and another value may be a binary or hexadecimal number. In those embodiments, the media guidance application may utilize a look-up table (e.g., in a database) in order to translate the values into one format for comparison.

At step 614, the media guidance application determines (e.g., via control circuitry 304) whether the retrieved value matches the reference value. If the two values do not match, then the media guidance application moves to step 616 and ends process 600. However, if the values match, the media guidance application moves to step 618. At step 618, the media guidance application stores (e.g., via control circuitry 304 in storage 308) information indicating that an emergency alert has been received.

It is contemplated that the descriptions of FIG. 6 may be used with any other embodiment of this disclosure. In addition, steps of process 600 may be performed in alternative orders or in parallel to further the purposes of this disclosure. For example, steps 606 and 608 may be performed in any order or in parallel or simultaneously to reduce lag or increase the speed of the system or method. As a further example, the media guidance application may use multiple logical processor threads or physical processors in order to increase performance. Furthermore, process 600 may be enhanced by incorporating branch prediction. It should be noted that process 600 may be implemented on a combination of appropriately configured software and hardware, and that any of the devices or equipment discussed in relation to FIGS. 3-4 may be used to implement one or more portions of the process.

FIG. 7 illustrates possible pseudo-code that may be used to implement process 600. It will be evident to one skilled in the art that pseudo-code of FIG. 7 may be implemented in any number of programming languages and on a variety of different hardware, and that the style and format should not be construed as limiting, but rather a general template of the steps and procedures that would be consistent with code used to implement process 600.

At line 702, the media guidance application executes (e.g., via control circuitry 304) a subroutine to initialize variables and prepare to start the routine to receive an emergency alert. For example, media guidance application may copy (e.g., via control circuitry 304) instructions from a non-transitory storage medium (e.g., storage device 308) into RAM or into the cache for processing circuitry 306. The media guidance application may execute the initialization subroutine in response to an interrupt from communications circuitry (e.g., a network card) via I/O Path 302 notifying the media guidance application that a new signal has been received.

At line 705, the media guidance application executes (e.g., via control circuitry 304) a subroutine to process a signal. The media guidance application may transmit a request for the signal (e.g., via I/O Path 302) to the communications circuitry. The media guidance application may then process the signal to extract data within the signal and store it in one or more variables (e.g., data). It should be noted that the media guidance application may use various techniques to process the signal. Those techniques may be different for different types of signals. For example, if the signal received is a digital signal, it may be processed by using filtering techniques such as a Fast Fourier Transform algorithm or Infinite Impulse Response algorithm. In some embodiments, the processing of the signal may be abstracted away and may be performed by communications circuitry.

At line 706, the media guidance application executes (e.g., via control circuitry 304) a subroutine to get signal type data. The media guidance application may parse the data retrieved from the signal based on a pre-programmed data format and extract from the data a field that includes a signal type and information pertaining to the signal type.

At line 707, the media guidance application executes (e.g., via control circuitry 304) a subroutine to extract from the field a value corresponding to the signal type. For example, for every emergency alert the value may be identical. However, this value may be different from a value corresponding to a signal type notifying the system of availability of new program listings.

At line 708, the media guidance application iterates (e.g., via control circuitry 304) through each target signal type using a "for" loop. For each target signal type, at line 709, the media guidance application compares the target signal type to the signal type of an emergency alert. It should be noted that in some embodiments these comparison operations may be done in parallel, as different threads or on different processors. When the media guidance application finds a target signal type that corresponds to an emergency alert, the media guidance application stores (e.g., via control circuitry 304 in storage 308) a value corresponding to this signal type, as indicated at line 710.

After the "for" loop is complete, the media guidance application compares (e.g., via control circuitry 304) the value from the received signal with the value corresponding to the emergency alert. If the values match, the media guidance application, at line 714, assigns a value of "true" to a variable indicating that an emergency alert has been received, and also assigns the emergency alert data to another variable or variables, so that this data may be processed later. The media guidance application proceeds to terminate (e.g., via control circuitry 304) the process, as indicated at line 718. For example, the media guidance application may clean up memory and destruct variables no longer needed.

It should be noted that pseudo-code in FIG. 7 may be implemented in any number of programming languages and on a variety of different hardware, and the particular choice and location of primitive functions, logical evaluations, and function evaluations are not intended to be limiting. It should also be noted that the code may be refactored or rewritten to manipulate the order of the various logical evaluations, perform several iterations in parallel rather than in a single iterative loop, or to otherwise manipulate and optimize run-time and performance metrics without fundamentally changing the inputs or final outputs.

After receiving the emergency alert, the media guidance application, at step 504, identifies (e.g., via control circuitry 304) a metadata portion of an emergency alert. Different types of emergency alerts are generated in specific formats. For example, an EAS alert has four parts: a digitally encoded Specific Area Message Encoding ("SAME") header, an attention signal, message content, and a digitally encoded end-of-message marker. In an EAS alert, the SAME header represents a metadata portion of the EAS alert.

Figure 8:
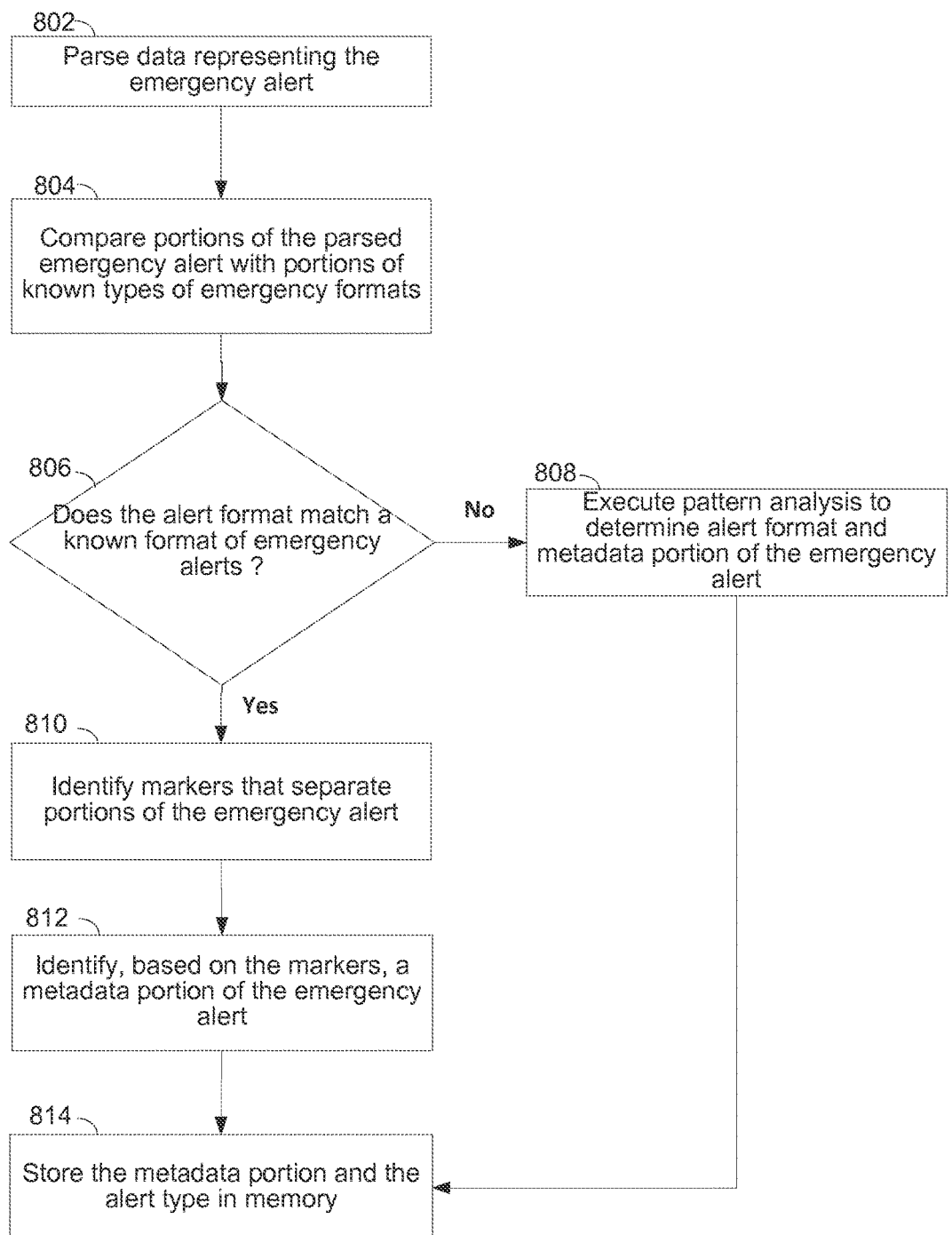
FIG. 8 depicts an illustrative process involved in identifying a metadata portion of an emergency alert, in accordance with some embodiments of this disclosure.

Process 800 of FIG. 8 illustrates one possible method of identifying a metadata portion of an emergency alert. At step 802, the media guidance application parses (e.g., via control circuitry 304) data representing an emergency alert. At step 804, the media guidance application, (.e.g., via control circuitry 304) compares portions of the parsed emergency alert with portions of known types of emergency alerts. For example, an EAS alert has a specific preamble that is unique to only EAS alerts. If the media guidance application compares a portion of the emergency alert with the preamble and finds a match, the media guidance application may then determine that the emergency alert is an EAS alert. In another example, a Wireless Emergency Alert includes XML tags (e.g., <alert>) to denote a beginning of an emergency alert. If the media guidance application compares a portion of the emergency alert with the <alert> XML tag and finds a match, the media guidance application then may determine that the emergency alert is in fact a Wireless Emergency Alert.

At step 806, the media guidance application determines (e.g., via control circuitry 304) whether the alert format of the emergency alert matches a known format of emergency alerts. As referred to herein, the term "alert format" refers to an arrangement of different portions of the alert. For example, a Wireless Emergency alert may be transmitted in an XML format that includes XML tags specifying different portions of the emergency alert. In another example, an EAS alert may be transmitted in a format that separates different portions by one second of blank audio and further separates different portions of the SAME header by including dashes between the data. Specifically, if it is determined that an EAS alert is being received by a set-top box (e.g., from media content source 416), the SAME header may be separated from the content of the alert by a one second interval where no audio is being transmitted. It should be noted that different separators may be used in conjunction with various alert types. For example, a video separator (e.g., a black frame or a white frame) may be used for alerts that include video signals. If an emergency alert is an XML file, XML tags may be used to separate out different portions of the emergency alert. If the emergency does not match a known format of emergency alerts, the process moves to step 808. At step 808, the media guidance application executes (e.g., via control circuitry 304) pattern analysis against the data representing the emergency alert in order to determine an alert format and a metadata portion of the emergency alert. For example, the media guidance application may analyze any text strings within the data representing the emergency alert and compare the text with known locations (e.g., New York, Kings County, etc.) and known alert causes (e.g., weather, amber, etc.) to determine the metadata associated with the emergency alert. In order to analyze the text, the media guidance application may run a search for strings in data representing the emergency alert. The media guidance application may then extract one or more strings from the data and compare those strings against a dictionary to determine whether words appear in the strings. The media guidance application may then compare the words to known locations (e.g., New York City) to determine the metadata associated with the emergency alert.

If the media guidance application determines that the emergency alert is of a known format of emergency alerts, the process moves to step 810. At step 810, the media guidance application identifies (e.g., via control circuitry 304) markers that separate portions of the emergency alert. Different markers may be stored for different formats of emergency alerts to denote different portions of those alerts. For example, for a Wireless Emergency Alert, where the alert is received as an XML document, the markers may be various XML tags. In another example, for an EAS alert, the markers between different portions of the EAS alert may be one second blank audio intervals.

At step 812, the media guidance application identifies (e.g., via control circuitry 304), based on the markers, a metadata portion of the emergency alert. For example, if the emergency alert is an EAS alert, the media guidance application may determine that the metadata portion of the emergency alert is data corresponding to the SAME header, which would be data between two blank one second audio intervals. At step 814, the media guidance application stores (e.g., via control circuitry 304 in storage 308) the metadata portion and the alert format of the emergency alert.

It is contemplated that the descriptions of FIG. 8 may be used with any other embodiment of this disclosure. In addition, steps of process 800 may be performed in alternative orders or in parallel to further the purposes of this disclosure. For example, the media guidance application may use multiple logical processor threads or physical processors in order to increase performance. Furthermore, process 800 may be enhanced by incorporating branch prediction. It should be noted that process 800 may be implemented on a combination of appropriately configured software and hardware, and that any of the devices or equipment discussed in relation to FIGS. 3-4 may be used to implement one or more portions of the process.

FIG. 9 illustrates possible pseudo-code that may be used to implement process 800. It will be evident to one skilled in the art that pseudo-code of FIG. 9 may be implemented in any number of programming languages and on a variety of different hardware, and that the style and format should not be construed as limiting, but rather a general template of the steps and procedures that would be consistent with code used to implement some embodiments of this disclosure.

At line 902, the media guidance application executes (e.g., via control circuitry 304) a subroutine to initialize variables and prepare to start the routine to identify a metadata portion of an emergency alert. For example, control circuitry 304 may copy instructions from non-transitory storage medium (e.g., storage device 308) into RAM or into the cache for processing circuitry 306.

At line 905, the media guidance application retrieves (e.g., via control circuitry 304) alert data and stores it in a variable. For example, the media guidance application may retrieve the alert data from storage 308. In some embodiments, the media guidance application may retrieve the alert data from a device different from the device where the media guidance application resides. For example, the media guidance application may retrieve the alert data from media content source 416 and/or media guidance data source 418 via communications network 414.

At line 906, the media guidance application parses (e.g., via control circuitry 304) the received alert. For example, the media guidance application may detect all strings in the emergency alert. At line 907, the media guidance application retrieves (e.g., via control circuitry 304 from storage 308) data corresponding to different emergency alert formats. That data may include unique identifiers for the different formats of emergency alerts. For example, if the received emergency alert is an EAS alert, the binary preamble may be stored as a unique identifier for an EAS alert. In another example, if the received emergency alert is a Wireless Emergency Alert, the <alert> XML tag may be stored as a unique identifier for a Wireless Emergency Alert.

At line 908, the media guidance application executes (e.g., via control circuitry 304) a "for" loop to iterate through all retrieved alert formats. At line 909, the media guidance application performs a comparison between a unique identifier for each alert format and parsed data of the received emergency alert. If the media guidance application finds a unique identifier for an emergency alert format in the parsed data, the media guidance application, at line 910, retrieves the corresponding alert markers. For example, the media guidance application may retrieve the emergency alert format markers that separate portions of an emergency alert from storage 308. Additionally or alternatively, the media guidance application may retrieve those markers from media content source 416 and/or media guidance data source 418 via communications network 414.

At line 911, the media guidance application identifies (e.g., via control circuitry 304) the metadata portion of the emergency alert. The media guidance application may perform the identification by retrieving metadata markers corresponding to the beginning and the end of a metadata portion of the emergency alert. The media guidance application may then search the parsed emergency alert for the beginning marker and the end marker of the metadata portion. When the media guidance application finds those locations, the media guidance application may store (e.g., in storage 308) the data between the markers as the metadata portion of the emergency alert. At line 912, the media guidance application executes (e.g., via control circuitry 304) a termination subroutine. The termination subroutine may be executed in the same manner as described in connection with FIG. 7. For example, the media guidance application may clean up memory and destruct variables no longer needed.

If the media guidance application, upon the completion of the "for" loop, does not match the emergency alert with an emergency alert format, the media guidance application executes (e.g., via control circuitry 304) pattern analysis against the emergency alert. The media guidance application may execute the same pattern analysis process as the pattern analysis process of FIG. 8. At line 918, the media guidance application executes (e.g., via control circuitry 304) a termination subroutine. For example, the media guidance application may clean up memory and destruct variables no longer needed.

It should be noted that pseudo-code in FIG. 9 may be implemented in any number of programming languages and on a variety of different hardware, and the particular choice and location of primitive functions, logical evaluations, and function evaluations are not intended to be limiting. It should also be noted that the code may be refactored or rewritten to manipulate the order of the various logical evaluations, perform several iterations in parallel rather than in a single iterative loop, or to otherwise manipulate and optimize run-time and performance metrics without fundamentally changing the inputs or final outputs.

Figure 10:
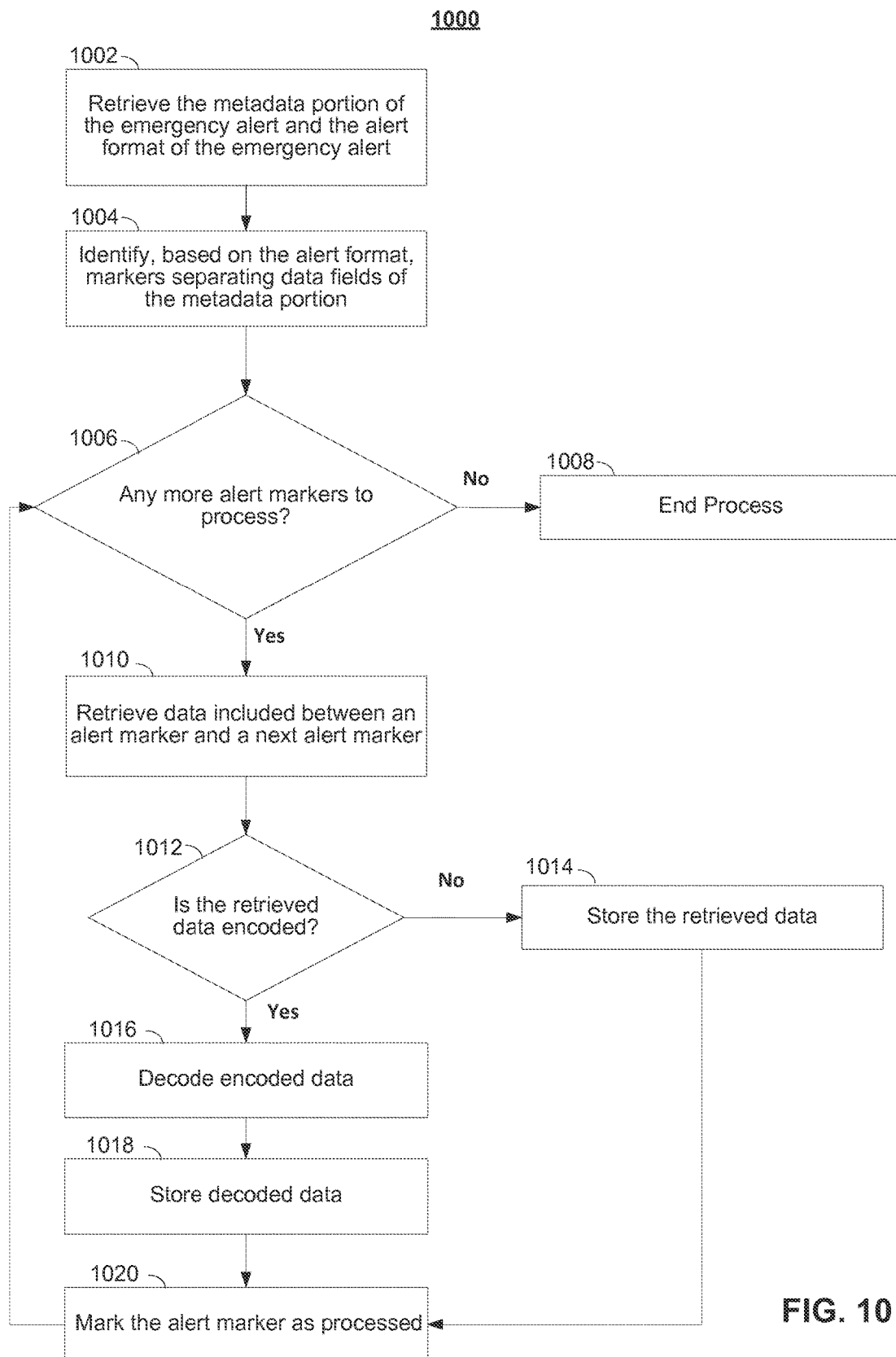
FIG. 10 depicts an illustrative process involved in extracting metadata information from the metadata portion of an emergency alert, in accordance with some embodiments of this disclosure.

After identifying the metadata portion of the emergency alert at step 504 of FIG. 5, the media guidance application, at step 506 of FIG. 5, extracts (e.g., via control circuitry 304) metadata information from the metadata portion of the emergency alert. Process 1000 of FIG. 10 illustrates one possible process to extract the metadata information from the metadata portion of the emergency alert. At step 1002, the media guidance application retrieves (e.g., via control circuitry from storage 308) the metadata portion of the emergency alert and the alert format of the emergency alert. In some embodiments, the media guidance application may retrieve the metadata portion of the emergency alert and the alert format of the emergency alert from media content source 416 and/or media guidance data source 418 via communications network 414.

At step 1004, the media guidance application identifies (e.g., via control circuitry 304), based on the alert format, markers separating data fields of the metadata portion. For example, if the emergency alert is an EAS alert, the metadata portion of the emergency alert is the SAME header. The data in the same header is always arranged in the same way and is separated with dashes. Every EAS alert has the same format that may be represented by the sequence <Preamble>ZCZC-ORG-EEE-PSSCCC+TTTT-JJJH-HMM-LLLLLLLL-. The preamble is always a binary 10101011 (0xAB in hex) repeated sixteen times and is used for "receiver calibration." The preamble is always followed by a letter sequence "ZCZC," which is used in the decoding process. The "ZCZC" sequence is always followed by a dash to denote the end of the preamble portion. The next portion of any EAS alert is a three-letter code for an originator of the alert. Some possible codes include WXR (National Weather Service), CIV (Civil Authorities) and PEP (Primary Entry Point System) for alerts from the President of the United States and other federal officials. The rest of the protocol and details for EAS alerts may be found in 47 C.F.R. § 11, which is hereby incorporated by reference herein in its entirety. Thus, the media guidance application may identify dashes in an EAS alert as markers separating data fields.

At step 1006, the media guidance application determines (e.g., via control circuitry 304) whether any more markers need to be processed. If all markers have been processed, process 1000 moves to step 1008, where the process ends. If more markers must be processed, process 1000 moves to step 1010.

At step 1010, the media guidance application retrieves (e.g., via control circuitry 304 from storage 308) data included between the marker being processed and the next marker. For example, if the media guidance application has determined that the received emergency alert is an EAS alert, the media guidance application may retrieve data between two dashes. At step 1012, the media guidance application (e.g., via control circuitry 304) determines whether the retrieved data is encoded. If the emergency alert is an EAS alert, the media guidance application may make that determination by determining the field that is being processed. For example, the media guidance application may determine that the originator field is being processed; thus, the media guidance application may determine that the data is encoded. If the retrieved data is encoded, process 1000 moves to step 1014. At step 1014, the retrieved data is stored (e.g., in storage 308). If the data is encoded, process 1000 moves to step 1016.

At step 1016, the media guidance application (e.g., via control circuitry 304) decodes the encoded data. The media guidance application may decode the data by using a look-up table that stores the codes and corresponding decoded information. The look-up table may be located in a database. The database may be stored in storage 308 or on a remote device, for example, at media content source 416 and/or media guidance data source 418, which may be reached via communications network 414. For example, for an EAS alert, the look-up table may be created from information in 47 C.F.R. § 11, which includes, for example, various event codes for use in EAS alerts. At step 1018, the media guidance application stores (e.g., via control circuitry 304 in storage 308) the decoded data in memory. At step 1020, the media guidance application marks the alert marker as processed and moves onto the next alert marker. For example, the media guidance application may store an indication with each alert marker that indicates whether the marker has been processed.

It is contemplated that the descriptions of FIG. 10 may be used with any other embodiment of this disclosure. In addition, steps of process 1000 may be performed in alternative orders or in parallel to further the purposes of this disclosure. For example, the media guidance application may use multiple logical processor threads or physical processors in order to increase performance. Furthermore, process 1000 may be enhanced by incorporating branch prediction. It should be noted that process 1000 may be implemented on a combination of appropriately configured software and hardware, and that any of the devices or equipment discussed in relation to FIGS. 3-4 may be used to implement one or more portions of the process.

FIG. 11 illustrates possible pseudo-code that may be used to implement process 1000. It will be evident to one skilled in the art that pseudo-code of FIG. 11 may be implemented in any number of programming languages and on a variety of different hardware, and that the style and format should not be construed as limiting, but rather a general template of the steps and procedures that would be consistent with code used to implement some embodiments of this disclosure.

At line 1102, the media guidance application executes (e.g., via control circuitry 304) a subroutine to initialize variables and prepare to start the routine to extract metadata information from the metadata portion of the emergency alert. For example, in some embodiments control circuitry 304 may copy instructions from a non-transitory storage medium (e.g., storage device 308) into RAM or into the cache for processing circuitry 306 during the initialization stage.

At line 1105, the media guidance application retrieves (e.g., via control circuitry 304 from storage 308) the metadata portion of the received emergency alert and stores the retrieved metadata portion in a variable. For example, the media guidance application may retrieve the metadata portion of the emergency alert stored as a result of executing process 800. At line 1106, the media guidance application retrieves (e.g., via control circuitry 304 from storage 308) the alert format of the emergency alert and stores the retrieved data in a variable. For example, the media guidance application may retrieve the alert format of the emergency alert stored as a result of executing process 800.

At line 1107, the media guidance application executes (e.g., via control circuitry 304) a routine to identify alert markers based on the alert format of the emergency alert. As described above, with respect to FIG. 10, if the emergency alert is an EAS alert, the media guidance application may identify dashes as alert markers.

At step 1108, the media guidance application executes (e.g., via control circuitry 304) a "for" loop to iterate through each retrieved alert marker. At step 1109, the media guidance application executes (e.g., via control circuitry 304) a sub-routine to retrieve the next alert marker and stores the next alert marker in a variable. For example, in an EAS alert, each alert marker is a dash, and data between the dashes represents fields of the metadata of the EAS alert. At step 1110, the media guidance application executes (e.g., via control circuitry 304) a subroutine to retrieve the data between the two alert markers. In some embodiments, the data may be a simple string. In some embodiments, however, the data may be an encoded string of characters and/or numbers.

At step 1112, the media guidance application determines (e.g., via control circuitry 304) whether the retrieved data is encoded. The media guidance application may make the determination via a look-up table that stores information on metadata fields of different types of emergency alerts. For example, if the received emergency alert is an EAS alert, the media guidance may perform a look-up of the metadata field against a look-up table similar to one described above in connection with FIG. 10. Alternatively, if an alert is an XML-based alert (e.g., a Wireless Emergency alert) the media guidance application may make the determination based on an XML tag corresponding to the metadata field. The media guidance application may perform a look-up against a look-up table described above to determine whether the data in the XML tag is encoded.

If the data is encoded, the media guidance application at line 1113 decodes (e.g., via control circuitry 304) the data and stores the decoded data in a variable representing the data field. The media guidance application may execute the same decoding routine as described in connection with FIG. 10. If the data is not encoded, the media guidance application stores (e.g., via control circuitry 304) the unencoded data in a variable.

At line 1116, the media guidance application increments (e.g., via control circuitry 304) a counter used in relation to storing the different data fields. At line 1117, the media guidance application moves to the next step of the "for" loop, and at line 1120 the media guidance application executes (e.g., via control circuitry 304) a termination sub-routine. The termination sub-routine may be similar to the termination sub-routine of FIG. 9.

It should be noted that pseudo-code in FIG. 11 may be implemented in any number of programming languages and on a variety of different hardware, and the particular choice and location of primitive functions, logical evaluations, and function evaluations are not intended to be limiting. It should also be noted that the code may be refactored or rewritten to manipulate the order of the various logical evaluations, perform several iterations in parallel rather than in a single iterative loop, or to otherwise manipulate and optimize run-time and performance metrics without fundamentally changing the inputs or final outputs.

Figure 12:
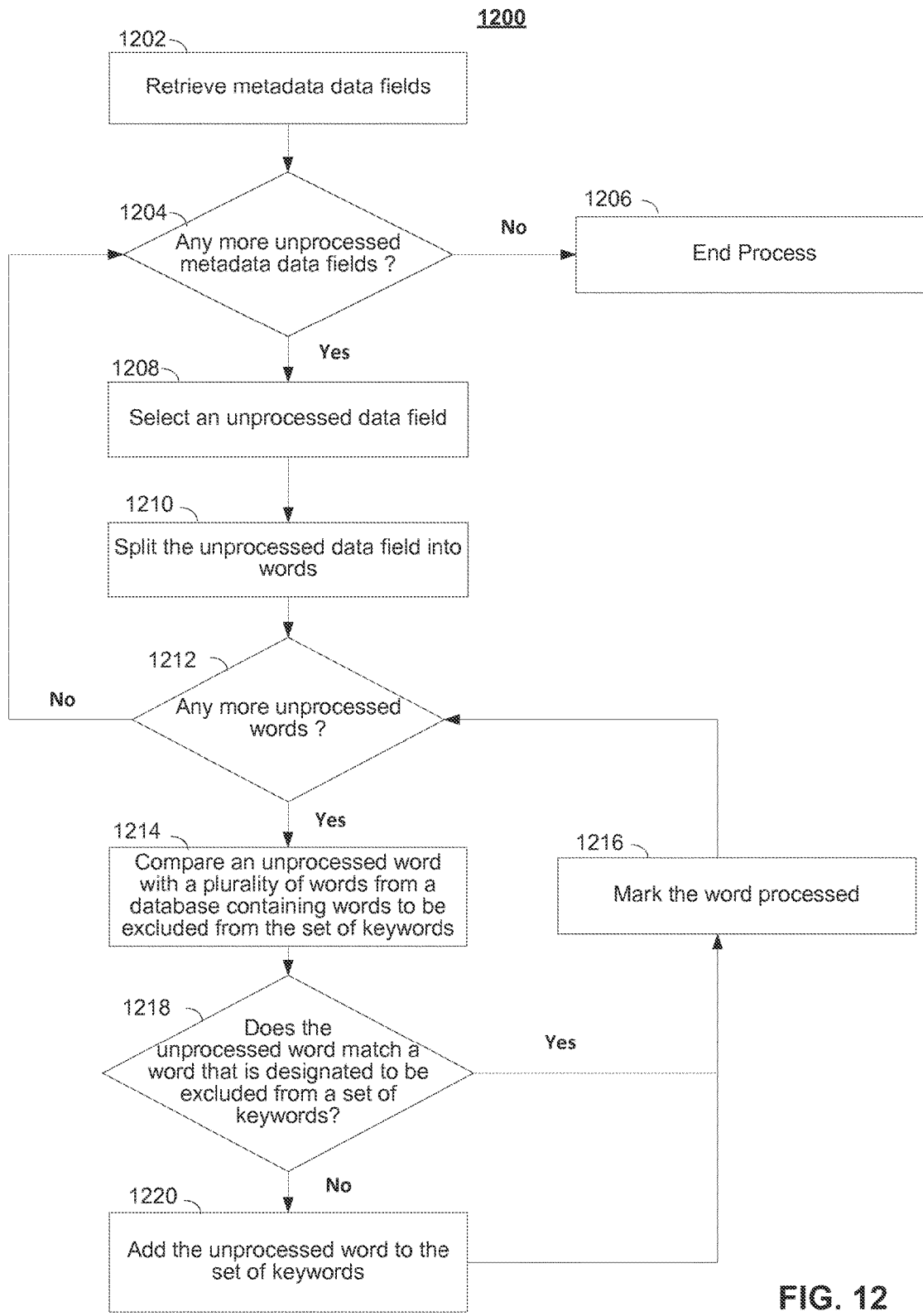
FIG. 12 depicts an illustrative process involved in determining, based on the metadata information, a set of keywords associated with an emergency alert, in accordance with some embodiments of this disclosure.

After extracting the metadata information from the metadata potion of the emergency alert, the media guidance application, in step 508 of FIG. 5, determines (e.g., via control circuitry 304), based on the metadata information, a set of keywords associated with the emergency alert. Process 1200 of FIG. 12 is an example of an illustrative process to determine, based on the metadata information, a set of keywords associated with an emergency alert.

In some embodiments, process 1200 may be encoded onto a non-transitory storage medium (e.g., storage device 308) as a set of instructions to be decoded and executed by processing circuitry (e.g., processing circuitry 306). Processing circuitry may in turn provide instructions to other sub-circuits contained within control circuitry 304, such as the tuning, video-generating, encoding, decoding, encrypting, decrypting, scaling, analog/digital conversion circuitry, and the like.

At step 1202, the media guidance application retrieves (e.g., via control circuitry 304 from storage 308) metadata data fields. For example, the media guidance application may retrieve the data fields stored as a result of the media guidance application executing process 1100 of FIG. 11. At step 1204, the media guidance application determines whether any more data fields have been unprocessed. If all data fields have been processed, the media guidance application moves to step 1206 and ends process 1200. If more unprocessed metadata fields remain, process 1200 moves to step 1208.

At step 1208, the media guidance application selects the next unprocessed data field. At step 1210, the media guidance application splits the unprocessed data field into strings. For example, the media guidance application may execute a routine to separate characters between spaces to derive strings. Additionally, the media guidance application may compare the derived strings to words in a database to confirm that each derived string is in fact a word.

At step 1212, the media guidance application determines (e.g., via control circuitry 304) whether any more words are unprocessed. If all the words have been processed, process 1200 moves to step 1204 and to the next field. If more unprocessed words exist, process 1200 moves to step 1214.

At step 1214, the media guidance application compares (e.g., via control circuitry 304) an unprocessed word against a plurality of words from a database that are to be excluded from the set of keywords. For example, it may be desirable to exclude words that do not correspond to the specific alert. Specifically, words like "emergency" or common words such as "the" or "at" may be excluded from the set of keywords. At step 1218, the media guidance application determines whether the unprocessed word matches a word designated to be excluded from any set of keywords. If the word matches a word designated to be excluded from any set of keywords, then process 1200 moves to step 1216, where the media guidance application marks the word processed and moves to step 1212. If the word does not match a word designated to be excluded from the set of keywords, process 1200 moves to step 1220.

At step 1220, the media guidance application adds (e.g., via control circuitry 304) the word to the set of keywords. Process 1200 then moves to step 1216 where the word is marked as processed.

It is contemplated that the descriptions of FIG. 12 may be used with any other embodiment of this disclosure. In addition, steps of process 1200 may be performed in alternative orders or in parallel to further the purposes of this disclosure. The media guidance application may use multiple logical processor threads or physical processors in order to increase performance. Furthermore, process 1200 may be enhanced by incorporating branch prediction. It should be noted that process 1200 may be implemented on a combination of appropriately configured software and hardware, and that any of the devices or equipment discussed in relation to FIGS. 3-4 may be used to implement one or more portions of the process.

Process 1200 of FIG. 12 may be implemented using pseudo-code illustrated in FIG. 13. It will be evident to one skilled in the art that the process described by the pseudo-code in FIG. 13 may be implemented in any number of programming languages and a variety of different hardware, and that the style and format should not be construed as limiting, but rather a general template of the steps and procedures that would be consistent with code used to implement some embodiments of this disclosure.

At line 1302, the media guidance application executes (e.g., via control circuitry 304) a subroutine to initialize variables and prepare to start the routine to receive an emergency alert. For example, in some embodiments control circuitry 304 may copy instructions from a non-transitory storage medium (e.g., storage device 308) into RAM or into the cache for processing circuitry 306 during the initialization stage. At line 1305, the media guidance application executes (e.g., via control circuitry 304) a subroutine to retrieve the data fields corresponding to the received emergency alert. For example, the media guidance application may retrieve the data fields stored as a result of executing process 1100 of FIG. 11.

At line 1306, the media guidance application executes (e.g., via control circuitry 304) a "for" loop to iterate through each retrieved data field. At line 1307, the media guidance application splits (e.g., via control circuitry 304) each data field into strings. The media guidance application may perform the split operation in the same manner as described above, in relation to FIG. 12.

At line 1308, the media guidance application executes (e.g., via control circuitry 304) a second "for" loop to iterate through each string from the split data field. At line 1309, the media guidance application determines (e.g., via control circuitry 304) whether the string that is being processed by the second "for" loop exists in a database of words designated not to be included in the set of keywords and stores the result in a variable. At line 1310, the media guidance application determines (e.g., via control circuitry 304) whether the determination of line 1309 is true. If the determination at line 1310 is false, the media guidance application adds (e.g., via control circuitry 304) the string to the set of keywords at line 1311. It should be noted that at this point, the media guidance application may determine whether each string is an encoded keyword by comparing each string with a database of encoded keywords. The media guidance application may then decode the string and stored the decoded version of the string.

At lines 1313 and 1314, the media guidance application proceeds to the next steps of the two "for" loops. At line 1319, the media guidance application executes a termination subroutine. The termination subroutine has been described in connection with FIG. 11.

Figure 14:
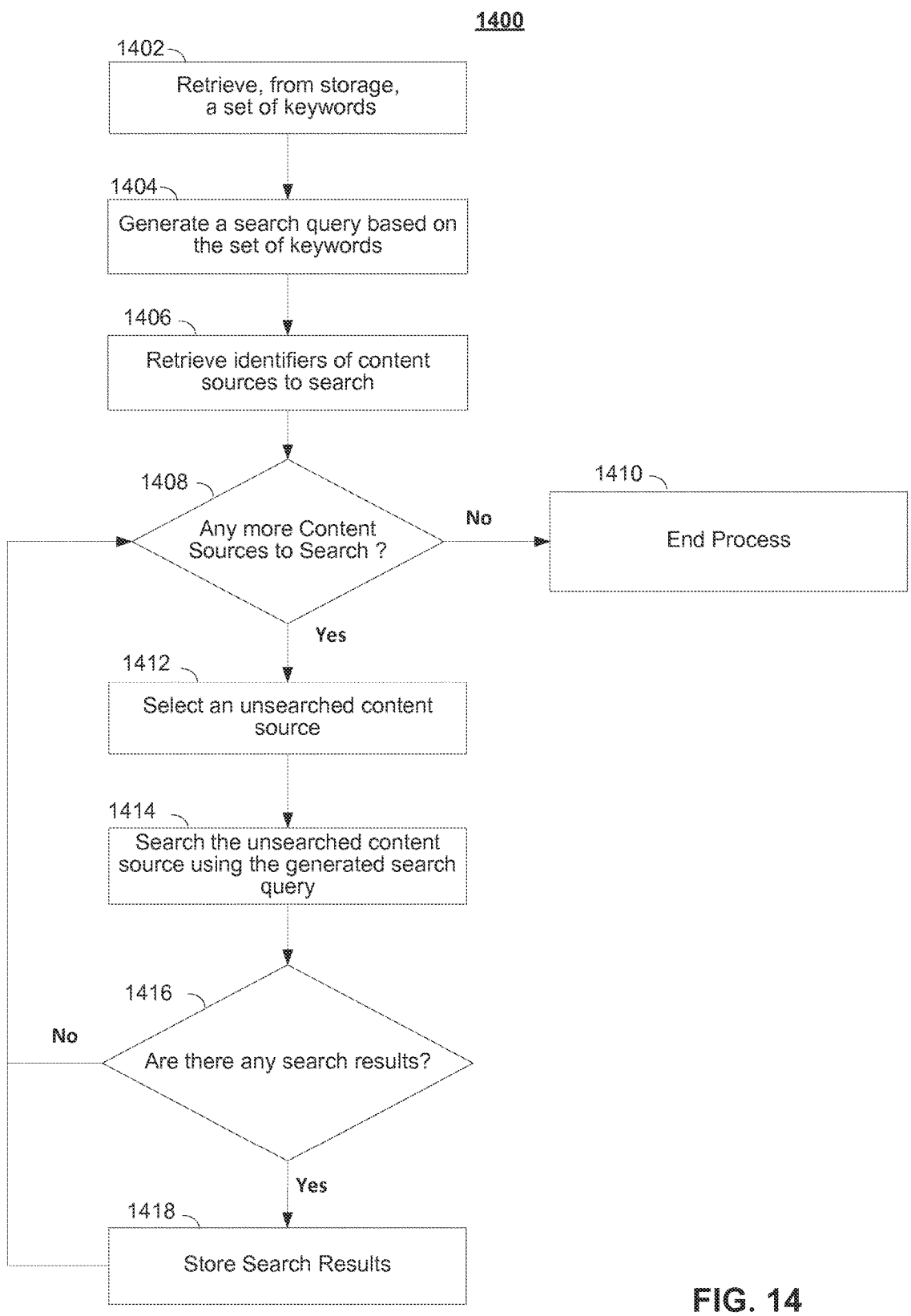
FIG. 14 depicts an illustrative process involved in identifying, based on the set of keywords, a plurality of media assets related to an emergency alert, in accordance with some embodiments of this disclosure.

After the media guidance application determines, based on the metadata information, a set of keywords associated with the emergency alert, the media guidance application, at step 510 of FIG. 5, identifies (e.g., via control circuitry 304), based on the set of keywords, a plurality of media assets related to the emergency alert. Process 1400 of FIG. 14 illustrates one possible method to identify, based on a set of keywords, a plurality of media assets related to the emergency alert.

In some embodiments, process 1400 may be encoded onto a non-transitory storage medium (e.g., storage device 308) as a set of instructions to be decoded and executed by processing circuitry (e.g., processing circuitry 306). Processing circuitry may in turn provide instructions to other sub-circuits contained within control circuitry 304, such as the tuning, video-generating, encoding, decoding, encrypting, decrypting, scaling, analog/digital conversion circuitry, and the like.

At step 1402, the media guidance application retrieves (e.g., via control circuitry 304) from storage (e.g., storage 308) a set of keywords. For example, the media guidance application may retrieve the set of keywords generated as a result of executing process 1200 of FIG. 12. At step 1404, the media guidance application generates (e.g., via control circuitry 304) a search query based on the set of keywords. The media guidance application may generate one query based on all the keywords or a number of queries based on different subsets of the keywords. For example, the media guidance application may generate a query based on a location of the alert and the alert type (e.g., weather, disaster, amber) of the alert. As referred to herein, the term "alert type" refers to the cause of the emergency alert. For example, a Blizzard Warning is referred to herein as an alert type. A full list of alert types is published in 47 C.F.R. § 11.

At step 1406, the media guidance application retrieves (e.g., via control circuitry 304 from storage 308) identifiers of content sources to search. In some embodiments, the media guidance application may retrieve the identifiers of content sources to search from a remote location (e.g., media content source 416 and/or media guidance data source 418) via communications network 414. For example, the media guidance application may be configured with a table (e.g., in a database) that includes a row for every content source to be searched. Each row may include a column that contains a search command to search that specific content source. For example, if the content source is an Internet search engine, the search command column may contain a URL of the search engine. If the content source is a database, the search command column may contain the database server, the database name, as well as other information needed to execute a search. In some embodiments, searching of content sources may be performed on a server (e.g., a server located at media content source 416 or media guidance data source 418). For example, the media guidance application may transmit the set of keywords to the server, and the server may include a mechanism for performing a search. Specifically, the server may be programmed with appropriate Application Programming Interfaces ("APIs") that are able to access the search engines to search different content sources. For example, a search engine (e.g., Google®) may require a specific URL with specific parameters in order to execute a search. An API for Google® may be included with the media guidance application that can receive, as input, various keywords and as an output build a string (e.g., a URL) that can be used as input to the Google® search engine to execute a search. The content sources searched may include the Internet, specifically websites, blogs, headlines, and specific news websites. Other sources may include program listings both local to the set-top box and remote to the set-top box (e.g., media content source 416 and/or media guidance data source 418).

At step 1408, the media guidance application determines whether more content sources must be searched. If no further content sources must be searched, process 1400 moves to step 1410 and ends. If more content sources must be searched, process 1400 moves to step 1412. At step 1412, the media guidance application (e.g., via control circuitry 304) selects an unsearched content source. At step 1414, the media guidance application searches the selected unsearched content source using the generated search query. For example, the media guidance application may search program listings stored in storage 308. Additionally or alternatively, the media guidance application may search program listings as well as other content sources stored at media content source 416 and/or media guidance data source 418. It should be noted that the media guidance application may be pre-configured to search specific content sources. For example, the media guidance application may be pre-configured to search program listings. If different program listing providers offer different APIs for searching those listings, the media guidance application may be configured with new APIs to search those program listings. The media guidance application may also be pre-configured to search the Internet (e.g., via search engines). In some embodiments, the media guidance application may be configured with an Internet crawler that may independently crawl websites and search for keywords (e.g., keywords described above). The media guidance application may also be configured to search any other source (e.g., a private network).

In some embodiments, the media guidance application may search the Internet for information related to the emergency alert. That information may include media assets, websites, blogs, news websites, and social media sites (e.g., Facebook, Twitter, etc.). For example, the media guidance application may perform the search using commercial search engines (e.g., Google®). The media guidance application may also use custom search engines for the search. For example, certain websites (e.g., Twitter.com) may have custom search engines to search content on those websites.

At line 1416, the media guidance application determines whether any search results have been returned by the search of step 1414. If no results have been returned, process 1400 moves to step 1408 where a determination is made whether another content source must be searched. If at least one result is returned, process 1400 moves to step 1418. At step 1418, the media guidance application stores (e.g., via control circuitry 304 in storage 308) results of the search.

It is contemplated that the descriptions of FIG. 14 may be used with any other embodiment of this disclosure. In addition, steps of process 1400 may be performed in alternative orders or in parallel to further the purposes of this disclosure. For example, the media guidance application may use multiple logical processor threads or physical processors in order to increase performance. Furthermore, process 1400 may be enhanced by incorporating branch prediction. It should be noted that process 1400 may be implemented on a combination of appropriately configured software and hardware, and that any of the devices or equipment discussed in relation to FIGS. 3-4 may be used to implement one or more portions of the process.

Process 1400 of FIG. 14 may be implemented using pseudo-code illustrated in FIG. 15. It will be evident to one skilled in the art that the process described by the pseudo-code in FIG. 15 may be implemented in any number of programming languages and on a variety of different hardware, and that the style and format should not be construed as limiting, but rather a general template of the steps and procedures that would be consistent with code used to implement some embodiments of this disclosure.

At line 1502, the media guidance application executes (e.g., via control circuitry 304) a subroutine to initialize variables and prepare to start the routine to receive an emergency alert. For example, in some embodiments control circuitry 304 may copy instructions from a non-transitory storage medium (e.g., storage device 308) into RAM or into the cache for processing circuitry 306.

At line 1505, the media guidance application retrieves (e.g., via control circuitry 304 from storage 308) a set of keywords related to the emergency alert. The media guidance application may retrieve the set of keywords generated by process 1300 of FIG. 13. At line 1506, the media guidance application executes (e.g., via control circuitry 304) a subroutine to generate a search query based on the set of keywords. The media guidance application may generate the search query as described above, in relation to FIG. 14.

At line 1507, the media guidance application initializes (e.g., via control circuitry 304) a variable that is to store the search results found while searching various content sources. At line 1508, the media guidance application retrieves (e.g., via control circuitry 304 from storage 308) content sources to be searched. In some embodiments, the media guidance application may retrieve the content sources from a remote location (e.g., media content source 416 and/or media guidance data source 418 via communications network 414). The same table may be utilized so store content source information as described with respect to FIG. 14.

At line 1509, the media guidance application executes (e.g., via control circuitry 304) a "for" loop to iterate through each content source. At line 1510, the media guidance application searches (e.g., via control circuitry 304) through the content source currently being processed by the "for" loop. At line 1511, the media guidance application determines (e.g., via control circuitry 304) whether any search results have been returned. If search results have been returned, they are stored in a variable, at line 1512.

At line 1514, the next step of the For Loop is executed, and at line 1517 the media guidance application executes (e.g., via control circuitry 304) a termination subroutine when the "for" loop is completed. The termination subroutine may be the same or similar subroutine as described in connection with FIG. 13, 11, 9, or 7.

It will be evident to one skilled in the art that process 1500 described by the pseudo-code in FIG. 15 may be implemented in any number of programming languages and on a variety of different hardware, and the particular choice and location of primitive functions, logical evaluations, and function evaluations are not intended to be limiting. It will also be evident that the code may be refactored or rewritten to manipulate the order of the various logical evaluations, perform several iterations in parallel rather than in a single iterative loop, or to otherwise manipulate and optimize run-time and performance metrics without fundamentally changing the inputs or final outputs.

Figure 16:
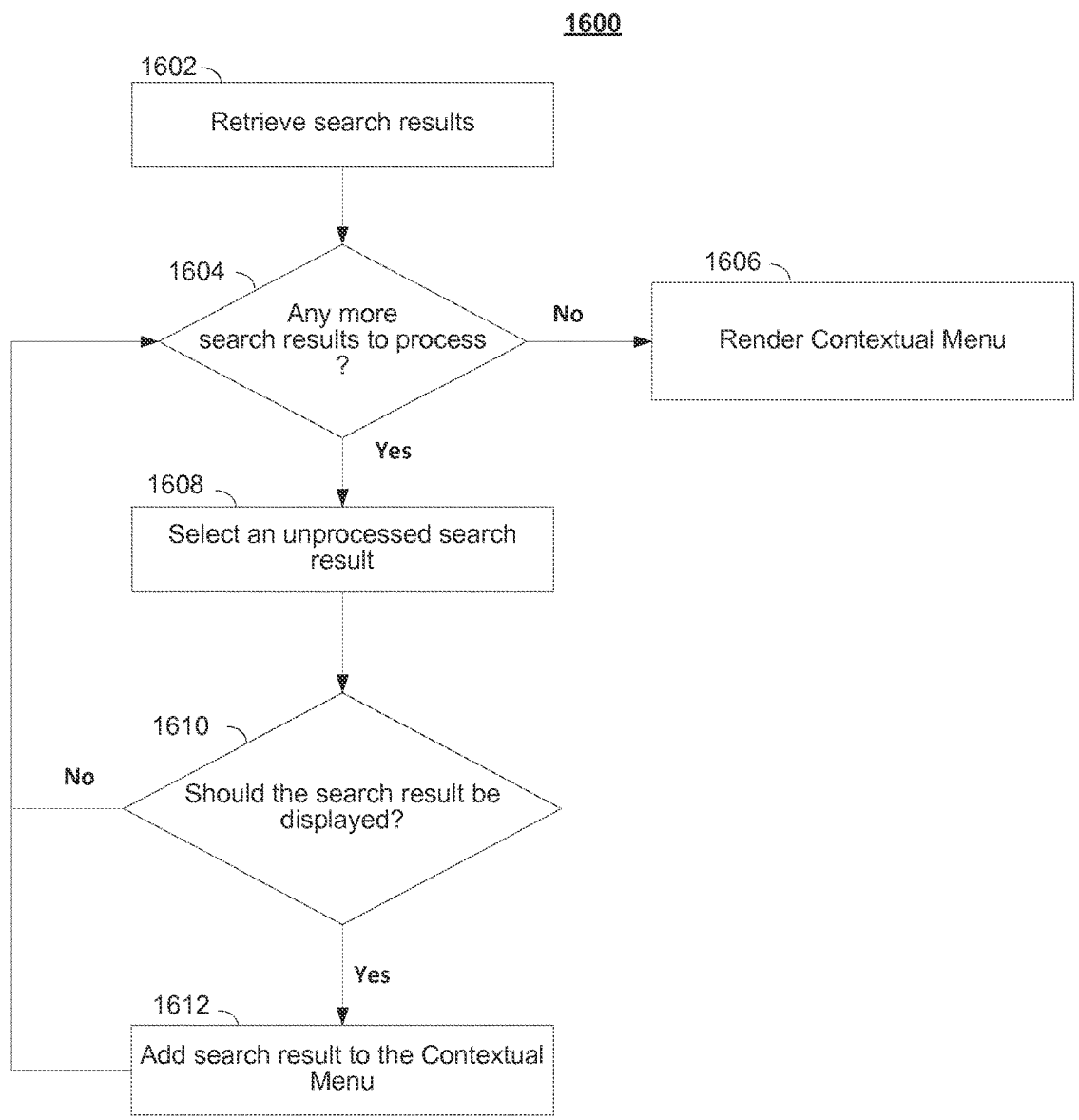
FIG. 16 depicts an illustrative process involved in generating for display a contextual menu that includes a plurality of user-selectable options corresponding to at least one media asset of the plurality of media assets related to the emergency alert, in accordance with some embodiments of this disclosure.

After the media guidance application identifies, based on a set of keywords, a plurality of media assets related to an emergency alert, the media guidance application, at step 512 of FIG. 5, generates for display (e.g., via control circuitry 304) a contextual menu that includes a plurality of user-selectable options corresponding to at least one media asset of the plurality of media assets related to the emergency alert. It should be noted that a media asset may be a television program or a radio broadcast or an Internet web page, a blog, a trending topic, etc., as described in connection with various content sources described above. The selectable options may include options for conventional media assets (e.g., news programs, weather reports, etc.). However, these selectable options may also include options for unconventional media assets, such as web pages, trending topics, etc. Process 1600 of FIG. 16 illustrates one possible method generating for display the contextual menu.

In some embodiments, process 1600 may be encoded onto a non-transitory storage medium (e.g., storage device 308) as a set of instructions to be decoded and executed by processing circuitry (e.g., processing circuitry 306). Processing circuitry may in turn provide instructions to other sub-circuits contained within control circuitry 304, such as the tuning, video-generating, encoding, decoding, encrypting, decrypting, scaling, analog/digital conversion circuitry, and the like.

At step 1602, the media guidance application retrieves (e.g., via control circuitry 304 from storage 308) search results. The media guidance application may retrieve search results found as a result of executing process 1400 of FIG. 14. At line 1604, the media guidance application determines (e.g., via control circuitry 304) whether any more search results must be processed. If no more search results must be processed, process 1600 moves to step 1606. For example, the media guidance application may store each search result in a data structure (e.g., an array). Each array element may include an object that includes an address of the search result (e.g., a Uniform Resource Location address), title, description, etc. In addition, each array element may include a Boolean value that is set to "true" when the search result has been processed by the system (i.e., determined whether the search result is to be displayed in the contextual menu, as described below). The Boolean value may be set to "false"

if the search result has not been processed. At step 1606 the contextual menu is rendered. For example, the media guidance application may transmit a command to a video process to render the contextual menu. The render command may include specific instructions to the video process as to what must be rendered. If more search results need to be processed, process 1600 moves to step 1608.

At step 1608, the media guidance application selects (e.g., via control circuitry 304) an unprocessed search result. At step 1610, the media guidance application determines (e.g., via control circuitry 304) whether the selected search result should be displayed. The media guidance application may use various methods to make the determination. For example, only results where a certain threshold of matching keywords has been met may be added to the contextual menu. In some embodiments, the media guidance application may only add search results to the contextual menu where both the location of the emergency alert and the type of the emergency alert (e.g., amber, weather, disaster, etc.) are found within the search result. In some embodiments, the media guidance application may be configured to add search results from only specific content sources.

In yet some embodiments, the media guidance application may be configured to give more weight to certain content sources and add search results from those content sources to the contextual menu until the menu is full. For example, the media guidance application may be configured to add, to the contextual menu, a maximum of five options corresponding to five media assets. If the media guidance application has added all the search results from the content source that is given more weight and the contextual menu is not yet full, the media guidance application may add search results from other content sources. In some embodiments, the media guidance application may be configured to add one media asset from each search content source, before adding further media assets to the contextual menu.

In some embodiments, the media guidance application may use a weighted average of different criteria in order to determine which search results to add to the contextual menu. For example, the media guidance application may give more weight to media assets where a larger number of keywords match than to media assets where a small number of keywords match. In some embodiments, the media guidance application may be configured to weigh one content source more heavily than a second content source. This may be based upon an editor preference or upon the reliability of the content source in the past. If the media guidance determines that the result should not be displayed in the contextual menu, process 1600 moves to step 1604. If the media guidance application determines that the search result is to be displayed in the contextual menu, process 1600 moves to step 1612.

At step 1612, the media guidance application adds the search result to the contextual menu. For example, the media guidance application may be maintaining a data structure representing the contextual menu. The data structure may be an instantiation of a class that includes parameters such as name, color, as well as other parameters that may be desired. Additionally, the contextual menu class may include a subclass for search results. The subclass may include parameters such as a link to the search results (e.g., Internet link or tune to a channel command), title, description, etc. The media guidance application may then add the search result to the data structure, specifying the correct parameters required by the data structure.

It is contemplated that the descriptions of FIG. 16 may be used with any other embodiment of this disclosure. In addition, steps of process 1600 may be performed in alternative orders or in parallel to further the purposes of this disclosure. For example, the media guidance application may use multiple logical processor threads or physical processors in order to increase performance. Furthermore, process 1600 may be enhanced by incorporating branch prediction. It should be noted that process 1600 may be implemented on a combination of appropriately configured software and hardware, and that any of the devices or equipment discussed in relation to FIGS. 3-4 may be used to implement one or more portions of the process.

Process 1600 of FIG. 16 may be implemented using pseudo-code illustrated in FIG. 17. It will be evident to one skilled in the art that the process described by the pseudo-code in FIG. 17 may be implemented in any number of programming languages and on a variety of different hardware, and that the style and format should not be construed as limiting, but rather a general template of the steps and procedures that would be consistent with code used to implement some embodiments of this disclosure.

At line 1702, the media guidance application executes (e.g., via control circuitry 304) a subroutine to initialize variables and prepare to start the routine to receive an emergency alert. For example, in some embodiments control circuitry 304 may copy instructions from a non-transitory storage medium (e.g., storage device 308) into RAM or into the cache for processing circuitry 306 during the initialization stage.

At line 1705, the media guidance application retrieves search results. For example, the media guidance application may retrieve (e.g., via control circuitry 304) search results stored as part of process 1500 of FIG. 15. At line 1706, the media guidance application initializes (e.g., via control circuitry 304) the contextual menu. For example, the media guidance application may initialize a data structure described in connection with FIG. 16.

At line 1707, the media guidance application executes a "for" loop to iterate through each search result. At line 1708, if the media guidance application determines that the search result being processed by the "for" loop should be added to the contextual menu, the media guidance application executes a routine to add the search result to the contextual menu. For example, the search result may be added to an instantiation of the contextual menu class as a search result subclass object. At line 1711, process 1700 moves to the next step of the "for" loop. At line, 1712, the media guidance application executes a rendering subroutine. The rendering subroutine instructs a video processor to render the contextual menu.

It will be evident to one skilled in the art that pseudo-code 1700 in FIG. 17 may be implemented in any number of programming languages and on a variety of different hardware, and the particular choice and location of primitive functions, logical evaluations, and function evaluations are not intended to be limiting. It will also be evident that the code may be refactored or rewritten to manipulate the order of the various logical evaluations, perform several iterations in parallel rather than in a single iterative loop, or to otherwise manipulate and optimize run-time and performance metrics without fundamentally changing the inputs or final outputs.

Figure 18:
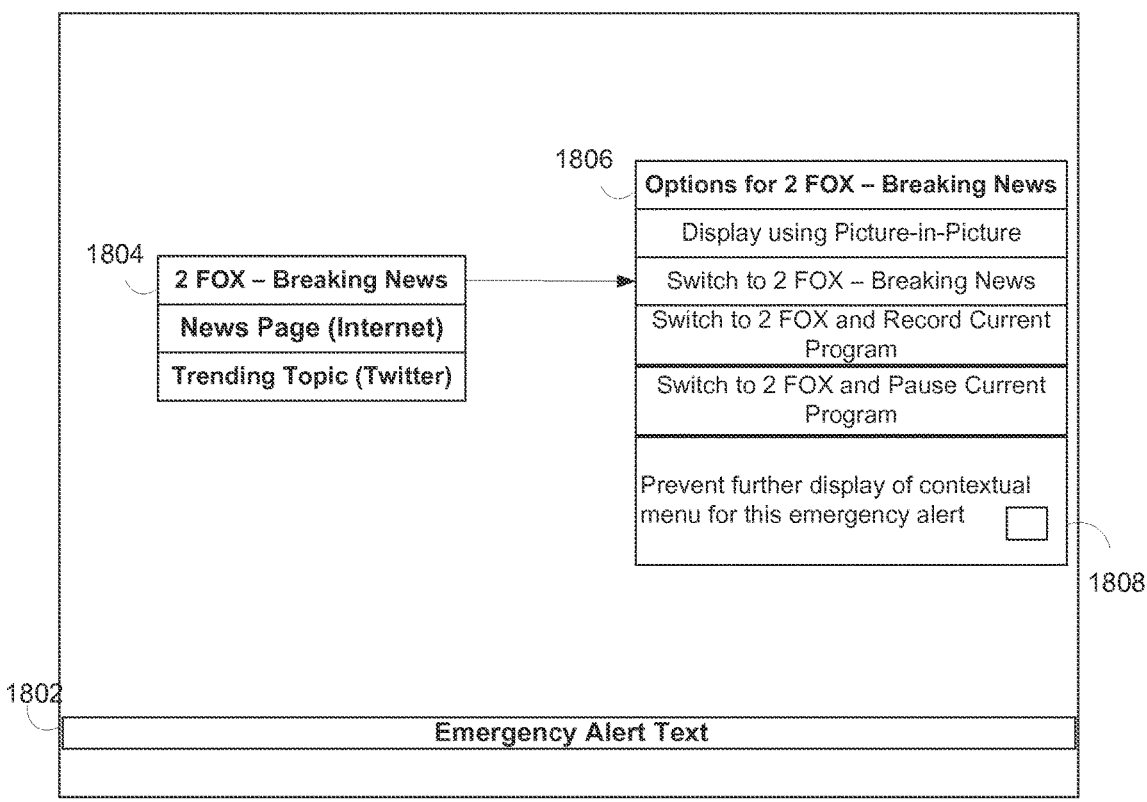
FIG. 18 depicts an illustration of a contextual menu that includes a plurality of user-selectable options corresponding to at least one media asset of the plurality of media assets related to the emergency alert, in accordance with some embodiments of this disclosure.

Screen 1800 of FIG. 18 illustrates one possible rendering of a contextual menu. Emergency Alert Ticker 1802 is generated for display on the bottom portion of screen 1800. The media guidance application may use Alert Ticker 1802 to present various types of information to the user. In some embodiments, the media guidance application may use Alert Ticker 1802 to present a received emergency alert to the user. For example, the Alert Ticker may first present the content of the alert (e.g., text) and then metadata information (e.g., location, type, etc.) associated with the received emergency alert. In some embodiments, Alert Ticker 1802 may scroll the metadata and content of the emergency alert until all the information has been presented to the user. In some embodiments, Alert Ticker 1802 may repeat the information a predetermined number of times.

Submenu 1804 illustrates different kinds of media assets related to the emergency alert that the media guidance application may have found via a search process (e.g., the search process discussed above in relation to FIGS. 14 and 15). Those results include a Breaking News Story, a News Page and a Trending Topic. It should be noted that Submenu 1804 may present results from different sources. For example, the Breaking News Story may be a television program that the media guidance application may generate for display in a response to a user selecting the Breaking News Story. The News Page may correspond to an Internet website, and a Trending Topic may be from a different Internet source.

Sub-menu 1806 illustrates different options available to the user when the user selects one of the media assets. For example, the media guidance application may receive input from a user to tune to channel 2. When the media guidance application receives the input, it may tune to channel 2 using picture-in-picture functionality of a set-top box. The media guidance application may simply tune to the Breaking News Story without using the picture-in-picture functionality. Other options include recording the current program and pausing the current program.

In some embodiments, the media guidance application may provide an option to record the media content currently being accessed by the user. For example, the media guidance application may determine whether it is residing on a device that includes recording functionality (e.g., a DVR). If the device where the media guidance application resides does include recording functionality, the media guidance application may record the media content currently being accessed by the user. However, if the media guidance application determines that it resides on a device that does not include recording functionality (e.g., a simple set-top box), the media guidance application may not provide an option to record the media content. Alternatively, the media guidance application may query other devices on the user's media network to determine if another device on the user's media network includes recording functionality. The media guidance application, upon determining that there is another device on the user's media network that includes recording functionality, may send an instruction to that device to record the media content being accessed by the user. In some embodiments, the media guidance application may transmit an instruction to media content source 416 or media guidance data source 418 to perform the recording.

In some embodiments, the media guidance application may provide an option to the user to pause the media content that the user is presently accessing. The media guidance application may use a continuous ring buffer to store a certain amount (e.g., one hour) of media content that is tuned to by the device where the media guidance application resides. For example, the media guidance application may always be recording what the user is watching and erasing the oldest data as the continuous ring buffer becomes full. When the media guidance application receives a command to pause the media content, the media guidance application may generate a pointer to a specific position within the continuous ring buffer. The media guidance application may continue recording the media content as usual. When the media guidance application receives a command from the user to start playback from the pause point, the media guidance application may retrieve the pointer and start playback from the pointer's position in the continuous ring buffer. Box 1808, when selected by the user, enables the user to prevent further contextual menus from being presented for this emergency alert.

In some embodiments, the media guidance application may generate the contextual menu based on the content of the emergency alert. The media guidance application may first identify a content portion of the emergency alert. For example, if the media guidance application determines that the emergency alert is a Wireless Emergency Alert transmitted in an XML file, the media guidance application may use XML tags to identify the content portion of the emergency alert. If the media guidance application determines that the emergency alert is an EAS alert, the media guidance application may identify the content portion based on the blank one-second audio intervals separating the content portion.

The media guidance application may then extract content information from the content portion of the emergency alert. The media guidance application may extract the information from the content portion by using the same set of markers as described in connection with extracting the metadata portion of the emergency alert. The media guidance application may then identify the set of keywords based on the extracted content information.

If the media guidance application determines that the extracted content information is textual, then the media guidance application may split the text into strings and execute the same process as described above in connection with identifying keywords in the metadata portion of the emergency alert. However, if the media guidance application determines that the content information includes an audio portion or a video portion, the media guidance application may execute audio pattern recognition against the audio portion and video pattern recognition against the video portion. Both audio and video recognition methods may be used to generate textual data associated with the audio and video portions respectively.

Figure 19:
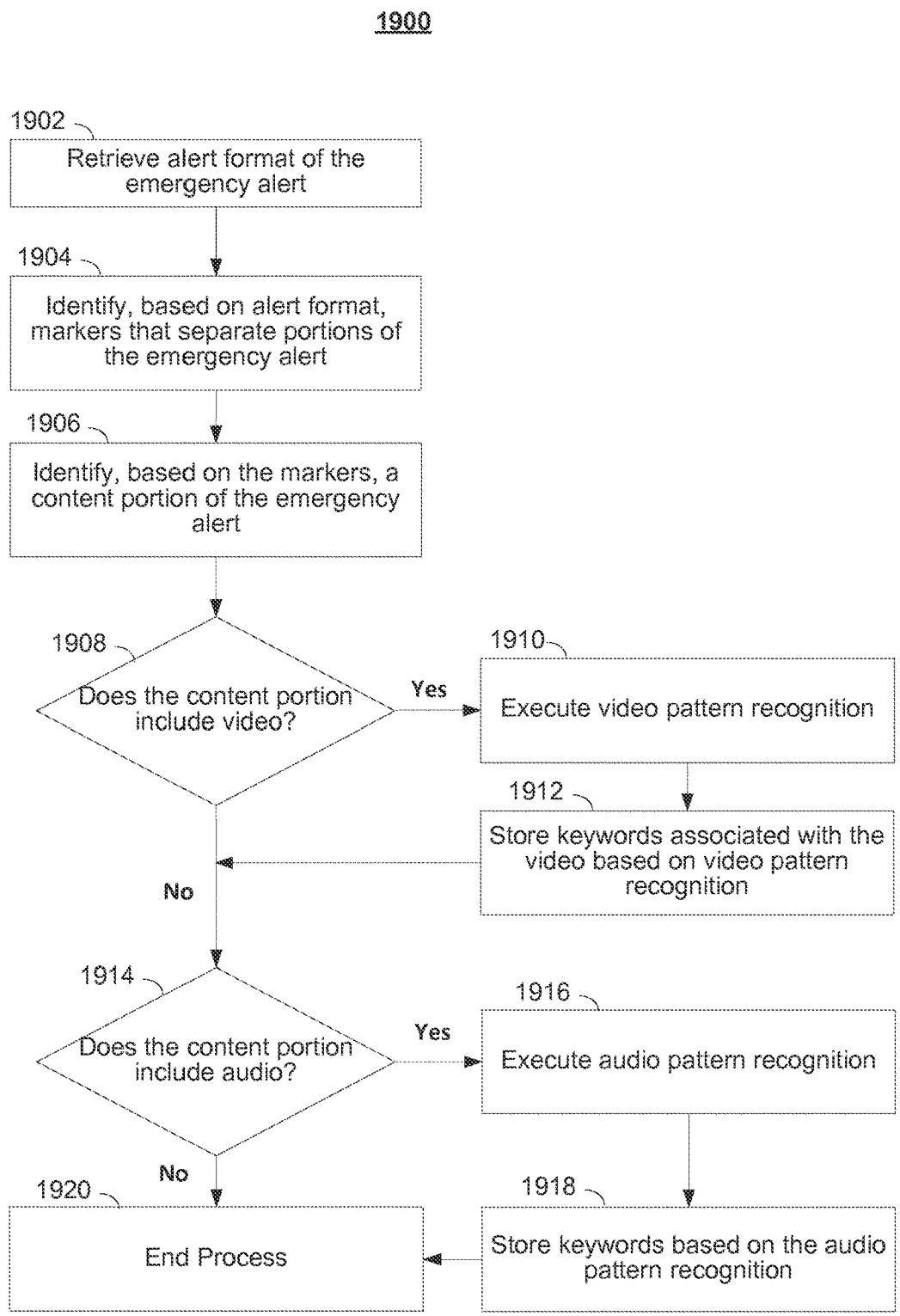
FIG. 19 depicts an illustrative process involved in determining, based on a content portion of an emergency alert, a set of keywords associated with the emergency alert, in accordance with some embodiments of this disclosure.

FIG. 19 illustrates a process involved in determining, based on a content portion of an emergency alert, a set of keywords associated with the emergency alert. At step 1902, the media guidance application retrieves (e.g., via control circuitry 304 from storage 308) an alert format of the emergency alert. At step 1904, the media guidance application identifies, based on the alert format, markers that separate portions of the emergency alert. The markers and their usage have been described above in relation to identifying a metadata portion of the emergency alert.

At step 1906, the media guidance application identifies (e.g., via control circuitry 304), based on the markers, a content portion of the emergency alert. The content portion of the emergency alert may include the notification of the emergency itself. For example, the content may be an audio or a video announcing the emergency. If the emergency is a flash flood warning, the content of the emergency alert may be audio that includes the details of the flash flood as described by an official authorized to make such announcements. Alternatively or additionally, the content of the emergency alert may be a textual announcement detailing the emergency. The identification may be performed in the same manner as described above in connection with identifying the metadata portion of the emergency alert. At step 1908, the media guidance application determines (e.g., via control circuitry 304) whether the content portion includes a video. The media guidance application may make that determination based on the encoding of the data within the content portion of the emergency alert. If the media guidance application determines that the content portion includes a video, process 1900 moves to step 1910.

At step 1910, the media guidance application executes (e.g., via control circuitry 304) video pattern recognition against the video of the content portion of the emergency alert, and at step 1912, the media guidance application stores (e.g., via control circuitry 304 in storage 308) the keywords associated with the video, based on the video pattern recognition. One video pattern recognition technique involves analyzing image data frame by frame and identifying objects within each frame. For example, the media guidance application may perform edge detection within a particular frame and, based on the results, detect contours of various objects within the frame.

Generally, two types of edge detection methods are used: search based and zero-crossing based. The search-based methods detect edges by first computing a measure of edge strength, usually a first-order derivative expression such as the gradient magnitude, and then searching for local directional maxima of the gradient magnitude using a computed estimate of the local orientation of the edge, usually the gradient direction. The zero-crossing based methods search for zero crossings in a second-order derivative expression computed from the image in order to find edges, usually the zero-crossings of the Laplacian or the zero-crossings of a non-linear differential expression. As a pre-processing step to edge detection, a smoothing stage, typically Gaussian smoothing, is almost always applied.

When edge detection is complete, the media guidance application may extract the different object discovered during edge detection. The media guidance application may then execute an object detection algorithm utilizing an object database that stores objects that are known and have been categorized into an available class. The object database may also store descriptions of the objects contained within the object database. When the object detection algorithm detects a particular object, the media guidance application may retrieve keywords describing the object from the object database.

At step 1914, the media guidance application determines (e.g., via control circuitry 304) whether the content portion includes audio. If the content portion includes audio, process 1900 moves to step 1916. At step 1916, the media guidance application executes (e.g., via control circuitry 304) audio pattern recognition against the audio in the content portion. For example, the media guidance application may use a two-tiered approach to execute audio pattern recognition. The media guidance application may execute an algorithm that detects speech and also an algorithm that is able to detect background or other audio signals being transmitted.

Various speech recognition techniques are available today. The media guidance application may use one of the techniques utilizing a Hidden Markov model. Hidden Markov models ("HMMs") use statistical models that output a sequence of symbols or quantities. HMMs are popular because they can be trained automatically and are simple and computationally feasible to use. In speech recognition, the hidden Markov model would output a sequence of n-dimensional real-valued vectors (with n being a small integer, such as 10), outputting one of these every 10 milliseconds. The vectors would consist of cepstral coefficients, which are obtained by taking a Fourier transform of a short time window of speech and decorrelating the spectrum using a cosine transform, then taking the first (most significant) coefficients. The hidden Markov model will tend to have in each state a statistical distribution that is a mixture of diagonal covariance Gaussians, which will give a likelihood for each observed vector. Each word, or (for more general speech recognition systems), each phoneme, will have a different output distribution; a hidden Markov model for a sequence of words or phonemes is made by concatenating the individual trained hidden Markov models for the separate words and phonemes. Once the phonemes are separated out they may be fingerprinted and compared to a database of known words in order to derive the specific word.

The media guidance application may detect other audio signals by filtering out any speech and generating a fingerprint of the specific audio signal. The media guidance application may then generate a fingerprint and transmit it to a database of known sounds for identification. The server where the database resides may, upon recognition of the fingerprint, transmit back keywords associated with the fingerprint. For example, the media guidance application may transmit a sound of ocean waves crashing against rocks. The media guidance application may get back keywords such as storm, high waves, etc. The media guidance application may then add these keywords to the set of keywords. At step 1918, the media guidance application stores (e.g., via control circuitry 304) keywords generated based on the audio pattern recognition. Process 1900 then moves to step 1920, where it ends.

It is contemplated that the descriptions of FIG. 19 may be used with any other embodiment of this disclosure. In addition, steps of process 1900 may be performed in alternative orders or in parallel to further the purposes of this disclosure. For example, the media guidance application may use multiple logical processor threads or physical processors in order to increase performance. It should be noted that process 1900 may be implemented on a combination of appropriately configured software and hardware, and that any of the devices or equipment discussed in relation to FIGS. 3-4 may be used to implement one or more portions of the process.

Process 1900 of FIG. 19 may be implemented using pseudo-code illustrated in FIG. 20. It will be evident to one skilled in the art that the process described by the pseudo-code in FIG. 20 may be implemented in any number of programming languages and on a variety of different hardware, and that the style and format should not be construed as limiting, but rather a general template of the steps and procedures that would be consistent with code used to implement some embodiments of this disclosure.

At line 2002, the media guidance application executes (e.g., via control circuitry 304) a subroutine to initialize variables and prepare to start the routine to receive an emergency alert. For example, in some embodiments control circuitry 304 may copy instructions from a non-transitory storage medium (e.g., storage device 308) into RAM or into the cache for processing circuitry 306 during the initialization stage.

At line 2005, the media guidance application retrieves (e.g., via control circuitry 304 from storage 308) an alert format of the emergency alert. The media guidance application may retrieve the alert format stored as a result of executing process 800. At line 2006, the media guidance application identifies (e.g., via control circuitry 304) alert markers based on the alert type of the emergency alert. For example, those markers may be stored in a data structure identifying a type of an emergency alert.

At line 2007, the media guidance application executes (e.g., via control circuitry 304) a subroutine to identify a content portion of the emergency alert based on the markers. This subroutine may be similar to the subroutine involved in identifying the metadata portion of the emergency alert, described above. At line 2008, the media guidance application determines (e.g., via control circuitry 304) whether video is included as part of the emergency alert. The media guidance application may make the determination in the same manner as described above, in connection with FIG. 19.

At line 2009, if video is included in the content portion of the emergency alert, the media guidance application executes (e.g., via control circuitry 304) video pattern recognition against the video of the content portion of the emergency alert. At line 2011, the media guidance application determines (e.g., via control circuitry 304) whether audio is included in the content portion of the emergency alert, and at line 2012, executes (e.g., via control circuitry 304) audio pattern recognition based on determining that audio is included in the content portion of the emergency alert.

At line 2016, the media guidance application executes (e.g., via control circuitry 304) a termination subroutine. The termination subroutine may be the same or similar subroutine as described in connection with FIG. 13, 11, 9, or 7.

It will be evident to one skilled in the art that pseudo-code 2000 in FIG. 20 may be implemented in any number of programming languages and on a variety of different hardware, and the particular choice and location of primitive functions, logical evaluations, and function evaluations are not intended to be limiting. It will also be evident that the code may be refactored or rewritten to manipulate the order of the various logical evaluations, perform several iterations in parallel rather than in a single iterative loop, or to otherwise manipulate and optimize run-time and performance metrics without fundamentally changing the inputs or final outputs.

In some embodiments, the media guidance application may present to the user those media assets that match both the location associated with the emergency alert and the alert type (e.g., amber, weather, disaster) of the emergency alert. The media guidance application may extract, from the metadata portion of an emergency alert, a first textual representation of a location associated with the emergency alert and a second textual representation of an alert type of the emergency alert. For example, if the media guidance application determines that the emergency alert is an EAS alert, the media guidance application may determine based on the format of an EAS alert which portion of the SAME header corresponds to a location and which portion of the header corresponds to the alert type. For example, the third field of the SAME header corresponds to an event code. The media guidance application may retrieve the event code from the same header and perform a code look-up against a look-up table in order to determine the alert type. The look-up table may be implemented as a table in a database and the media guidance application may access a database in order to do a table look-up. For example, an entry in the table may include code FFW representing a flash flood warning. A complete list may be found in 47 C.F.R. § 11.31, which is hereby incorporated by reference, in its entirety.

The media guidance application may then select a first media asset from the plurality of media assets related to the emergency alert. For example, the media guidance application may select an Internet web page as the first media asset. The media guidance application may then access textual data associated with the first media asset. In order to access the textual data the media guidance application may parse the Internet web page and separate HTML code from the textual information. If, for example, the media asset is a news program, the media guidance application may access program listing information associated with the media asset. Additionally or alternatively, the media guidance application may execute audio and video pattern analysis on the media asset in order to determine the textual data associated with the media asset.

The media guidance application may then compare the accessed textual data associated with the emergency alert with the first textual representation and the second textual representation. Thus, the media guidance application is searching for a location and emergency alert type to be present in the media asset.

In some embodiments, the media guidance application may present media assets to the user where both the location of the emergency alert and the emergency alert type are present within textual data associated with the media asset. The media guidance application may first determine whether the textual data associated with the first media asset matches both the first textual representation and the second textual representation. The media guidance application may make the determination by doing a simple string comparison. If both the location and the alert type are found within the textual data associated with the emergency alert, the media guidance application may include, in the contextual menu, a user-selectable option corresponding to the first media asset.

In some embodiments, the media guidance application may add media assets to the contextual menu based on the media assets meeting specific criteria. The media guidance application may extract textual content from each media asset of the plurality of media assets related to the emergency alert. Examples of extracting textual content from a media asset have been described above with respect to an Internet web page and a breaking news program.

The media guidance application may compare the textual content to the set of keywords associated with the emergency alert. The media guidance application may make the comparison using a straight string comparison function. The media guidance application may then determine, based on the comparing, a plurality of keywords that match the textual content. For example, the media guidance application may create a table that includes each word in the set of keywords, and then compare each word in the set with the textual content of each media asset. If there is a match, the media guidance application may update the table indicating that a match was found. In some embodiments, the media guidance application may also update the table to indicate how many matches of the keyword were found in the media asset. In those embodiments, the media guidance application may use the number of matches to weight a keyword higher or lower.

The media guidance application may then, based on a number of the plurality of keywords meeting a predefined threshold, include the corresponding user-selectable options in the contextual menu. For example, the media guidance application may be configured to include those media assets where at least 50% of the keywords match. In some embodiments, the media guidance application may weigh certain keywords higher than other keywords. For example, the table discussed above may have a weight associated with each keyword where a location keyword (e.g., New York) may have a higher weight than an originator keyword. In those instances, the media guidance application may calculate a 50% threshold by multiplying the keywords by their weights to arrive at the percentage of keywords that match.

In some embodiments, the media guidance application may include, in the contextual menu, trending topics related to the emergency alert. Trending topics may be useful to get a variety of useful information from a variety of sources. The media guidance application may first access trending topics on the Internet. For example, websites like Yahoo News and Twitter include trending topic sections. The media guidance application may then compare the set of keywords to each trending topic. For example, the media guidance application may extract textual content from each trending topic and compare each keyword in the set of keywords to the textual content of each trending topic. The media guidance application may then include, in the contextual menu, an option to access information associated with the trending topic based on determining that a trending topic matches a threshold number of keywords in the set of keywords.

In some embodiments, the media guidance application may be configured to take an automatic action when a user does not respond to a displayed contextual menu. The media guidance application may switch to a user-defined default content source associated with emergency alerts after a predetermined amount of time from the generation for display of the contextual menu. For example, the media guidance application may tune to a breaking news source illustrated in FIG. 18 after a specific amount of time (e.g., five minutes, 10 minutes, 30 minutes, etc.) passes without a user responding to the contextual menu.

In some embodiments, the media guidance application may perform other default actions upon expiration of a specific time period after the contextual menu has been presented. For example, the media guidance application may retrieve the top three media assets in the contextual menu as determined based on the amount of metadata matching the emergency alert and transmit those media assets to other devices associated with the user. Specifically, if the media guidance application resides on a set-top box, the media guidance application may record the breaking news and transmit the recording to a user's mobile device or a tablet device. The media guidance application may transmit the data in various forms. For example, the media guidance application may transmit the data via an e-mail. In some embodiments, the media guidance application may transmit a link to the recorded news break so that the mobile device and/or a tablet device may access the link over a network connection.

In some embodiments, the media guidance application may provide an option to a user to prevent the contextual menu from being displayed again when the emergency alert is repeated. FIG. 18 illustrates one possible screen of implementing the option to prevent a further contextual menu from being displayed based on the received emergency alert. The media guidance application may receive, from a user, input indicating that a further contextual menu for the same emergency alert should not be presented to the user. This may be useful in instances where the user has already received all the information that the user desires regarding the emergency alert. When the media guidance application receives the input from the user, the media guidance application may store (e.g., in storage 308) an indication and the received emergency alert. When further emergency alerts are received, the media guidance application may compare the received emergency alerts with the stored emergency alert, and if the alerts match, the media guidance application may prevent the contextual menu from being generated for display. In some embodiments, the media guidance application may be configured to automatically prevent the contextual menu from being generated for display when a user selects at least one option in the contextual menu.

In some embodiments, the media guidance application may provide further options in the contextual menu. The media guidance application may generate for display a corresponding media asset based on a user-selection of an option of the plurality of user-selectable options and also provide an option from a group of options. These options may include an option to record media content currently accessed by the user, an option to pause the media content currently accessed by the user, and an option to record the media content that the user is currently accessing on a device different from the device that the user is currently accessing the content on. These options are illustrated in FIG. 18. For example, the media guidance application may generate for display a contextual menu 1804 as shown in FIG. 18. When a user selects one of the options in the contextual menu 1804, the media guidance application may display options 1806 of the contextual menu. Options 1806 may be modified based on the type of media asset selected by the user. For example, options 1806 are shown for a "Breaking News" story. However, if the media guidance application receives user input selecting an "Internet News" page, the media guidance application may present a different set of options. For example, the media guidance application may generate for display an option to a user to navigate to the web page. The media guidance application may also generate for display an option to navigate to the web page using a different device (e.g., a tablet or a smart phone). The media guidance application may also provide an option to monitor the web page for updates and alert the user when an update is available. In order to monitor the web page, the media guidance application may access the web page at an interval (e.g., every one minute, five minutes, 30 minutes, etc.) and retrieve a timestamp of the web page. If the timestamp is updated, the media guidance application may alert the user of an update. Additionally or alternatively, the media guidance application may compare the content of the webpage to the content of the web page retrieved during the last time interval. If the web pages match, then no update has been made. However, if the web pages do not match, the media guidance application may alert the user of the change.

The above-described embodiments of the present disclosure are presented for purposes of illustration and not of limitation, and the present disclosure is limited only by the claims that follow. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted, the systems and/or methods described above may be applied to, or used in accordance with, other systems and/or methods.

What is claimed is:

1. A method for providing a contextual menu related to an emergency alert, the method comprising:
   receiving the emergency alert;
   in response to receiving the emergency alert, automatically identifying a metadata portion of the emergency alert without receiving user input that corresponds to or identifies the metadata portion of the emergency alert;
   extracting, from the metadata portion of the emergency alert, a first textual representation of a location associated with the emergency alert and a second textual representation of an alert type of the emergency alert;
identifying a plurality of media assets related to the emergency alert by, for each respective media asset in the identified plurality of media assets:
   extracting textual data associated with the respective media asset
   comparing the textual data associated with the respective media asset with the first textual representation and the second textual representation; and
   determining that the textual data associated with the respective media asset matches either the first textual representation or the second textual representation; and
generating for display the contextual menu comprising a plurality of user-selectable options corresponding to at least one media asset of the plurality of media assets related to the emergency alert.

2. The method of claim 1, further comprising:
identifying a content portion of the emergency alert;
extracting content information from the content portion of the emergency alert;
identifying a set of keywords based on the extracted content information; and
including a second set of media assets in the identified plurality of media assets that are related to the emergency alert by, for each respective media asset in the second set of media assets:
   extracting textual data associated with the respective media asset;
   comparing the textual data associated with the respective media asset with the identified set of keywords; and
   determining that the textual data associated with the respective media asset matches at least one of the identified set of keywords; and
   adding the respective media asset to the plurality of media assets related to the emergency alert.

3. The method of claim 2, wherein the content information comprises at least one of an audio portion and a video portion and wherein extracting the content information comprises:
   executing audio pattern recognition against the audio portion based on determining that the content information comprises the audio portion; and
   executing video pattern recognition against the video portion based on determining that the content information comprises the video portion.

4. The method of claim 1, wherein generating for display the contextual menu comprises:
   determining, based on the metadata portion, a set of keywords associated with the emergency alert;
   extracting textual content from each media asset of the plurality of media assets related to the emergency alert;
   comparing the textual content to the set of keywords associated with the emergency alert;
   determining, based on the comparing, for each media asset of the plurality of media assets related to the emergency alert, a plurality of keywords that match the textual content; and
   based on a number of the plurality of keywords meeting a predefined threshold, including the corresponding user-selectable options in the contextual menu.

5. The method of claim 1, wherein the generating for display the contextual menu comprises:
   determining, based on the metadata portion, a set of keywords associated with the emergency alert;
   accessing trending topics on the Internet;
   comparing the set of keywords to each trending topic; and
   including, in the contextual menu, an option to access information associated with the trending topic based on determining that a trending topic matches a threshold number of keywords in the set of keywords.

6. The method of claim 1, further comprising:
switching, to a user-defined default content source associated with emergency alerts, after a predetermined amount of time from the generation for display of the contextual menu.

7. The method of claim 1, further comprising generating for display an option to prevent the contextual menu from being displayed again based on the emergency alert.

8. The method of claim 1, further comprising:
generating for display a corresponding media asset based on a user-selection of a first option of the plurality of user-selectable options; and
generating for display a second option from a group of options comprising:
   an option to record media content currently accessed by the user, an option to pause the media content currently accessed by the user, and an option to record the media content that the user is currently accessing on a device different from the device that the user is currently accessing the content on.

9. A system for providing a contextual menu related to an emergency alert, the system comprising:
communications circuitry; and
control circuitry configured to:
   receive, using the communications circuitry, the emergency alert;
   in response to receiving the emergency alert, automatically identify a metadata portion of the emergency alert without receiving user input that corresponds to or identifies the metadata portion of the emergency alert;
   extract, from the metadata portion of the emergency alert, a first textual representation of a location associated with the emergency alert and a second textual representation of an alert type of the emergency alert;
   identify a plurality of media assets related to the emergency alert by, for each respective media asset in the identified plurality of media assets:
      extracting textual data associated with the respective media asset
      comparing the textual data associated with the respective media asset with the first textual representation and the second textual representation; and
      determining that the textual data associated with the respective media asset matches either the first textual representation or the second textual representation; and
   generate for display the contextual menu comprising a plurality of user-selectable options corresponding to at least one media asset of the plurality of media assets related to the emergency alert.

10. The system of claim 9, wherein the control circuity is further configured to:
identify a content portion of the emergency alert;
extract content information from the content portion of the emergency alert;
identify a set of keywords based on the extracted content information; and include a second set of media assets in the identified plurality of media assets that are related to the emergency alert by, for each respective media asset in the second set of media assets:
extracting textual data associated with the respective media asset;
comparing the textual data associated with the respective media asset with the identified set of keywords; and
determining that the textual data associated with the respective media asset matches at least one of the identified set of keywords; and
adding the respective media asset to the plurality of media assets related to the emergency alert.

11. The system of claim 10, wherein the content information comprises at least one of an audio portion and a video portion and wherein the control circuitry configured to extract the content information is further configured to:
execute audio pattern recognition against the audio portion based on determining that the content information comprises the audio portion; and
execute video pattern recognition against the video portion based on determining that the content information comprises the video portion.

12. The system of claim 9, wherein the control circuitry configured to generate for display the contextual menu is further configured to:
determine, based on the metadata portion, a set of keywords associated with the emergency alert;
extract textual content from each media asset of the plurality of media assets related to the emergency alert;
compare the textual content to the set of keywords associated with the emergency alert;
determine, based on the comparing, for each media asset of the plurality of media assets related to the emergency alert, a plurality of keywords that match the textual content; and
based on a number of the plurality of keywords meeting a predefined threshold, include the corresponding user-selectable options in the contextual menu.

13. The system of claim 9, wherein the control circuitry configured to generate for display the contextual menu is further configured to:
determine, based on the metadata portion, a set of keywords associated with the emergency alert;
access trending topics on the Internet;
compare the set of keywords to each trending topic; and
include, in the contextual menu, an option to access information associated with the trending topic based on determining that a trending topic matches a threshold number of keywords in the set of keywords.

14. The system of claim 9, further wherein the control circuitry is further configured to:
switch, to a user-defined default content source associated with emergency alerts, after a predetermined amount of time from the generation for display of the contextual menu.

15. The system of claim 9, wherein the control circuitry is further configured to generate for display an option to prevent the contextual menu from being displayed again based on the emergency alert.

16. The system of claim 9, wherein the control circuitry is further configured to:
generate for display a corresponding media asset based on a user-selection of a first option of the plurality of user-selectable options; and
generate for display a second option from a group of options comprising:
an option to record media content currently accessed by the user, an option to pause the media content currently accessed by the user, and an option to record the media content that the user is currently accessing on a device different from the device that the user is currently accessing the content on.

* * * * *